(12) United States Patent
Hefner et al.

(10) Patent No.: US 10,899,446 B2
(45) Date of Patent: Jan. 26, 2021

(54) UNMANNED AERIAL VEHICLES WITH INTERCHANGEABLE WING MODULES

(71) Applicant: Textron Innovations Inc., Providence, RI (US)

(72) Inventors: Levi Charles Hefner, Wichita, KS (US); Dakota Charles Easley, Dallas, TX (US)

(73) Assignee: Textron Innovations Inc., Providence, RI (US)

( * ) Notice: Subject to any disclaimer, the term of this patent is extended or adjusted under 35 U.S.C. 154(b) by 318 days.

(21) Appl. No.: 16/113,577

(22) Filed: Aug. 27, 2018

(65) Prior Publication Data

US 2020/0062391 A1 Feb. 27, 2020

(51) Int. Cl.
*B64C 39/02* (2006.01)
*B64C 3/56* (2006.01)

(52) U.S. Cl.
CPC .............. *B64C 39/024* (2013.01); *B64C 3/56* (2013.01); *B64C 2201/028* (2013.01); *B64C 2201/042* (2013.01); *B64C 2201/102* (2013.01); *B64C 2201/104* (2013.01); *B64C 2201/141* (2013.01); *B64C 2201/165* (2013.01); *B64C 2211/00* (2013.01)

(58) Field of Classification Search
CPC .. B64C 3/32; B64C 3/56; B64C 39/10; B64C 2039/105; B64C 2201/028; B64C 2211/00; B64C 1/30; B64C 39/08
See application file for complete search history.

(56) References Cited

U.S. PATENT DOCUMENTS

| | | | |
|---|---|---|---|
| 9,714,087 B2 * | 7/2017 | Matsuda | B64C 39/024 |
| 9,963,228 B2 * | 5/2018 | McCullough | B64C 39/08 |
| 10,214,285 B2 * | 2/2019 | McCullough | B64C 29/02 |
| 10,220,944 B2 * | 3/2019 | McCullough | B64C 39/06 |
| 10,232,950 B2 * | 3/2019 | McCullough | B64C 39/02 |
| 10,252,796 B2 * | 4/2019 | Reichert | B64C 39/062 |
| 10,315,761 B2 * | 6/2019 | McCullough | B64C 11/28 |
| 10,377,482 B2 * | 8/2019 | Gibboney | B64C 3/54 |
| 10,442,522 B2 * | 10/2019 | Oldroyd | B64C 29/0033 |
| 10,661,892 B2 * | 5/2020 | McCullough | B64C 29/0033 |
| 2010/0051755 A1 * | 3/2010 | Nichols | B64C 39/068 244/45 R |

(Continued)

FOREIGN PATENT DOCUMENTS

CN 106275402 A * 1/2017 ............. B64C 27/08

*Primary Examiner* — Joseph W Sanderson
(74) *Attorney, Agent, or Firm* — Lawrence Youst PLLC

(57) ABSTRACT

An unmanned aerial vehicle has an airframe having first and second wing modules with first and second pylons extending therebetween. A thrust array is coupled to the airframe including two propulsion assemblies coupled to each of the first and second wings. An electric power system is operably associated with the thrust array and operable to provide power to each propulsion assembly. A flight control system is operably associated with the thrust array and operable to independently control the speed of each propulsion assembly. Each wing module is selected from a plurality of wing modules each having a respective function and each interchangeably couplable with the first and second pylons to enable the airframe to support the functions of the plurality of wing modules.

20 Claims, 17 Drawing Sheets

(56) References Cited

U.S. PATENT DOCUMENTS

| | | | |
|---|---|---|---|
| 2010/0282917 A1* | 11/2010 | O'Shea | B64C 39/024 |
| | | | 244/218 |
| 2011/0046821 A1* | 2/2011 | Grabowsky | B64F 5/10 |
| | | | 701/3 |
| 2012/0292435 A1* | 11/2012 | Karem | B64C 1/00 |
| | | | 244/36 |
| 2015/0284079 A1* | 10/2015 | Matsuda | B64C 39/024 |
| | | | 244/7 A |
| 2017/0361927 A1* | 12/2017 | Lavagen | B64C 39/024 |
| 2018/0002009 A1* | 1/2018 | McCullough | B64D 37/04 |
| 2018/0002011 A1* | 1/2018 | McCullough | B64C 11/28 |
| 2018/0002013 A1* | 1/2018 | McCullough | B64D 25/12 |
| 2018/0002014 A1* | 1/2018 | McCullough | B64C 39/06 |
| 2018/0002027 A1* | 1/2018 | McCullough | B64D 1/22 |
| 2018/0044011 A1* | 2/2018 | Reichert | B64C 39/062 |
| 2018/0265193 A1* | 9/2018 | Gibboney | B64C 39/08 |
| 2018/0339771 A1* | 11/2018 | Oldroyd | B64C 11/46 |
| 2018/0339772 A1* | 11/2018 | McCullough | B64C 39/08 |
| 2020/0062374 A1* | 2/2020 | Easley | B64C 3/48 |
| 2020/0062390 A1* | 2/2020 | Hefner | B64D 27/24 |
| 2020/0269967 A1* | 8/2020 | Chen | B64C 13/50 |

* cited by examiner

UNMANNED AERIAL VEHICLES WITH INTERCHANGEABLE WING MODULES

TECHNICAL FIELD OF THE DISCLOSURE

The present disclosure relates, in general, to unmanned aerial vehicles that are operable for mission specific optimization and, in particular, to unmanned aerial vehicles having interchangeable wing modules operable to optimize the unmanned aerial vehicle with enhanced capabilities matched to a specific mission.

BACKGROUND

Unmanned aircraft systems (UAS), also known as unmanned aerial vehicles (UAV) or drones, are self-powered aircraft that do not carry a human operator, use aerodynamic forces to provide vehicle lift, are autonomously and/or remotely operated, may be expendable or recoverable and may carry lethal or nonlethal payloads. UAS may be used in military, commercial, scientific, recreational and other applications. For example, military applications may include intelligence, surveillance and reconnaissance missions as well as attack missions. Civil applications may include aerial photography, search and rescue missions, inspection of utility lines and pipelines, humanitarian aid including delivering food, medicine and other supplies to inaccessible regions, environment monitoring, border patrol missions, cargo transportation, forest fire detection and monitoring, accident investigation and crowd monitoring, to name a few.

Recently, military organizations have indicated a desire for small unmanned aircraft systems that are operable as soldier borne sensors (SBS). Such soldier borne sensors should be easy to transport without putting a weight burden on the soldier and simple to deploy yet be capable of continuous flight during certain adverse conditions for minutes or hours. In addition, such soldier borne sensors should be capable of remote and/or autonomous flight in an operating theater of hundreds or thousands of meters including, for example, visual line of sight operations. Further, such soldier borne sensors should be capable of providing real-time information relevant to the area immediately surrounding the soldiers, enabling the soldiers to assess and respond to the most eminent threat and/or rapidly changing threats.

SUMMARY

In a first aspect, the present disclosure is directed to an unmanned aerial vehicle that includes a modular airframe including upper and lower wing modules each having an airfoil cross section and first and second pylons coupled between the upper and lower wing modules. The upper wing module is substantially parallel with the lower wing module and the first pylon is substantially parallel with the second pylon such that the airframe has a substantially rectangular cross section. A thrust array is coupled to the airframe including first and second propulsion assemblies coupled to the first wing module and third and fourth propulsion assemblies coupled to the second wing module. An electric power system is operably associated with the thrust array and is operable to provide power to each propulsion assembly. A flight control system is operably associated with the thrust array and operable to independently control the speed of each propulsion assembly. The upper wing module is selected from a plurality of upper wing modules each having a respective function and each interchangeably couplable with the first and second pylons to enable the airframe to support the functions of the plurality of upper wing modules.

In some embodiments, the upper wing module selected from the plurality of upper wing modules may be an autonomous navigation system wing module, a remote navigation system wing module, a sensor system wing module, a communication system wing module, a cargo storage wing module, a flight control system and electric power system wing module and/or combinations or permutations thereof.

In a second aspect, the present disclosure is directed to an unmanned aerial vehicle that includes a modular airframe including upper and lower wing modules each having an airfoil cross section and first and second pylons coupled between the upper and lower wing modules. The upper wing module is substantially parallel with the lower wing module and the first pylon is substantially parallel with the second pylon such that the airframe has a substantially rectangular cross section. A thrust array is coupled to the airframe including first and second propulsion assemblies coupled to the first wing module and third and fourth propulsion assemblies coupled to the second wing module. An electric power system is operably associated with the thrust array and is operable to provide power to each propulsion assembly. A flight control system is operably associated with the thrust array and operable to independently control the speed of each propulsion assembly. The lower wing module is selected from a plurality of lower wing modules each having a respective function and each interchangeably couplable with the first and second pylons to enable the airframe to support the functions of the plurality of lower wing modules.

In certain embodiments, the lower wing module selected from the plurality of lower wing modules may be an autonomous navigation system wing module, a remote navigation system wing module, a sensor system wing module, a communication system wing module, a cargo storage wing module, a flight control system and electric power system wing module and/or combinations or permutations thereof.

In a third aspect, the present disclosure is directed to an unmanned aerial vehicle that includes a modular airframe including upper and lower wing modules each having an airfoil cross section and first and second pylons coupled between the upper and lower wing modules. The upper wing module is substantially parallel with the lower wing module and the first pylon is substantially parallel with the second pylon such that the airframe has a substantially rectangular cross section. A thrust array is coupled to the airframe including first and second propulsion assemblies coupled to the first wing module and third and fourth propulsion assemblies coupled to the second wing module. An electric power system is operably associated with the thrust array and is operable to provide power to each propulsion assembly. A flight control system is operably associated with the thrust array and operable to independently control the speed of each propulsion assembly. The upper wing module is selected from a plurality of upper wing modules each having a respective function and each interchangeably couplable with the first and second pylons to enable the airframe to support the functions of the plurality of upper wing modules. The lower wing module is selected from a plurality of lower wing modules each having a respective function and each interchangeably couplable with the first and second pylons to enable the airframe to support the functions of the plurality of lower wing modules.

In some embodiments, the upper wing module selected from the plurality of upper wing modules may be an autonomous navigation system wing module and the lower wing module selected from the plurality of lower wing modules may be a sensor system wing module. In certain embodiments, the upper wing module selected from the plurality of upper wing modules may be a remote navigation system wing module and the lower wing module selected from the plurality of lower wing modules may be a sensor system wing module. In some embodiments, the upper wing module selected from the plurality of upper wing modules may be a flight control system and electric power system wing module and the lower wing module selected from the plurality of lower wing modules may be a sensor system wing module. In certain embodiments, the upper wing module selected from the plurality of upper wing modules may be a flight control system and electric power system wing module and the lower wing module selected from the plurality of lower wing modules may be a communication system wing module. In some embodiments, the upper wing module selected from the plurality of upper wing modules may be a cargo storage wing module and the lower wing module selected from the plurality of lower wing modules may be a flight control system and electric power system wing module.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

Figure 1A:
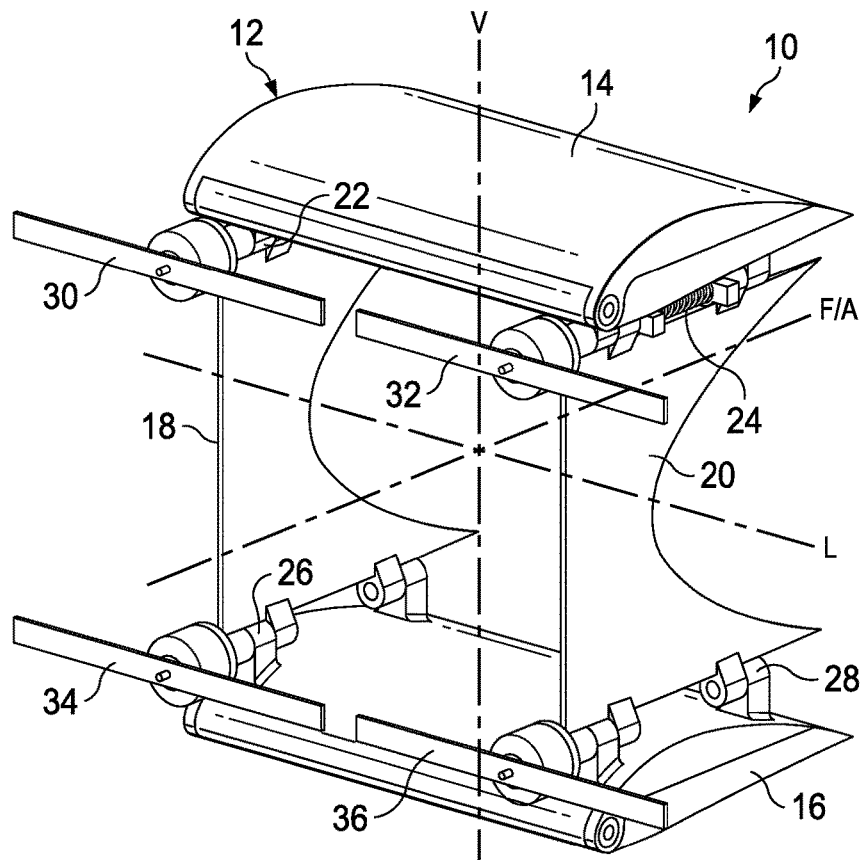
FIGS. 1A-1F are schematic illustrations of a compact unmanned aerial vehicle in accordance with embodiments of the present disclosure.

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the term "coupled" may include direct or indirect coupling by any means, including by mere contact or by moving and/or non-moving mechanical connections.

Referring to FIGS. 1A-1F in the drawings, an unmanned aerial vehicle having a flight mode and a compact storage mode is depicted and is referred to herein as aircraft 10. Aircraft 10 may be a small or mini unmanned aircraft system suitable for use as a soldier borne sensor. In the illustrated embodiment, aircraft 10 has an airframe 12 incorporating an upper wing 14 and lower wing 16 connected to one another by first pylon 18 and second pylon 20. Upper wing 14 is pivotably connected to first pylon 18 via first upper pivot joint 22 and second pylon 20 via second upper pivot joint 24. Similarly, lower wing 16 is pivotably connected to first pylon 18 via first lower pivot joint 26 and second pylon 20 via second lower pivot joint 28. Pivot joints 22, 24, 26, 28 facilitate rotation about axes parallel to the principal planes of wings 14, 16 and pylons 18, 20 and generally parallel to the principal flight direction of aircraft 10. Thus, during transition, pylons 18, 20 rotate about axes parallel to the principal forward flight direction of aircraft 10. In the flight mode of aircraft 10, upper wing 14 and lower wing 16 are generally and/or substantially parallel to each other. Likewise, first pylon 18 and second pylon 20 are generally and/or substantially parallel to each other. In addition, upper wing 14 and lower wing 16 are generally and/or substantially perpendicular to first pylon 18 and second pylon 20. Thus, upper wing 14, lower wing 16, pylon 18 and pylon 20 form a quadrilateral having a rectangular cross section and in some embodiments, a square cross section.

The components of airframe 12 including upper wing 14, lower wing 16, pylon 18 and pylon 20 may be formed from light-weight, high-strength materials, including but not limited to plastics, metals and composites. Plastics suitable for use may include foams, such as expanded polystyrene (EPS) foam. Metals suitable for use may include aluminum, magnesium and other lightweight, high-strength metals. Suitable composites may include fiberglass fabric, carbon fabric, fiberglass tape, carbon tape and combinations thereof. Composites may include a plurality of material layers of varying types and compositions.

In the flight configuration, aircraft 10 has a two-dimensional distributed thrust array including four propulsion assemblies 30, 32, 34, 36 that are independently operated and controlled by the flight control system of aircraft 10, as discussed herein. It should be noted, however, that the distributed thrust array of the present disclosure could have any number of independent propulsion assemblies including six, eight, twelve, sixteen or other number of independent propulsion assemblies. As used herein, the term "two-dimensional thrust array" refers to a plurality of thrust generating elements having substantially parallel axes of rotation forming a two-dimensional array when projected to a plane perpendicular to their axes of rotation. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements. In the flight configuration, the four independently operating propulsion assemblies 30, 32, 34, 36 form a two-dimensional distributed thrust array with each of the propulsion assemblies having a symmetrically disposed propulsion assembly. In the illustrated configuration, propulsion assemblies 30, 36 are symmetrically disposed propulsion assemblies and propulsion assemblies 32, 34 are symmetrically disposed propulsion assemblies. For torque balancing, propulsion assemblies 30, 36 may rotate clockwise while propulsion assemblies 32, 34 may rotate counter clockwise.

Figure 1B:
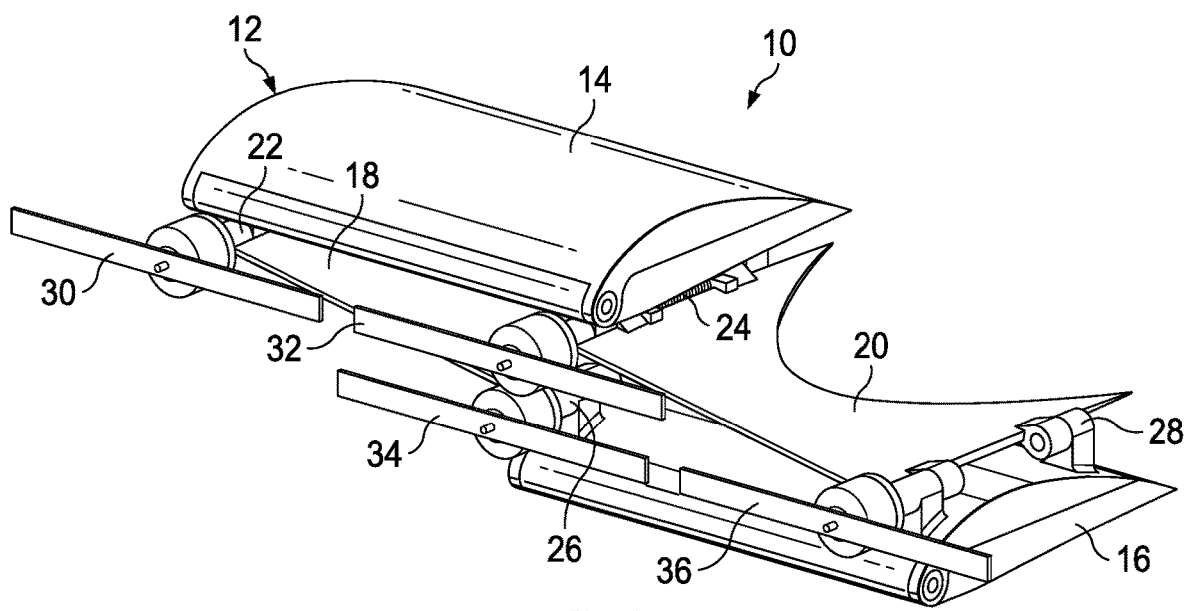
Figure 1C:
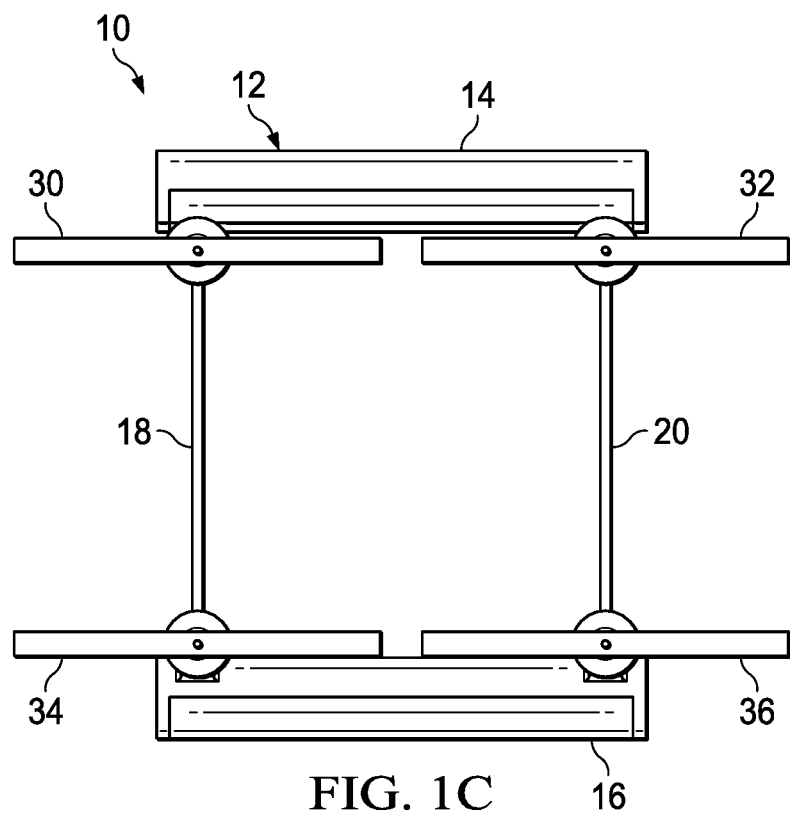
Figure 1D:
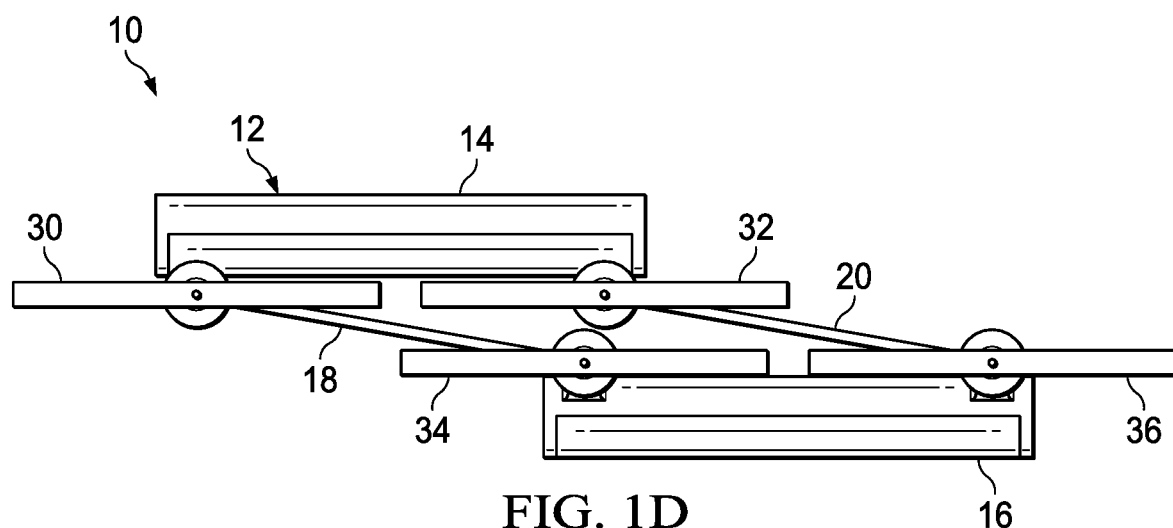
Figure 1E:
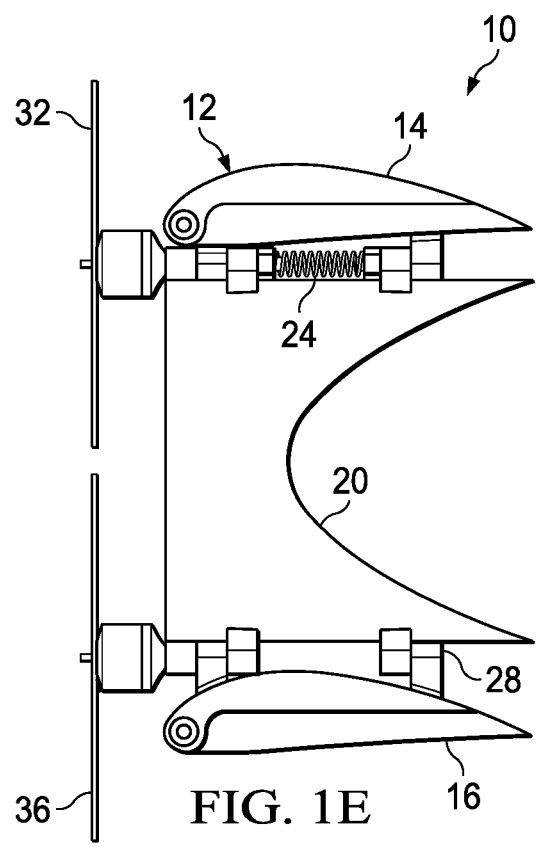
Figure 1F:
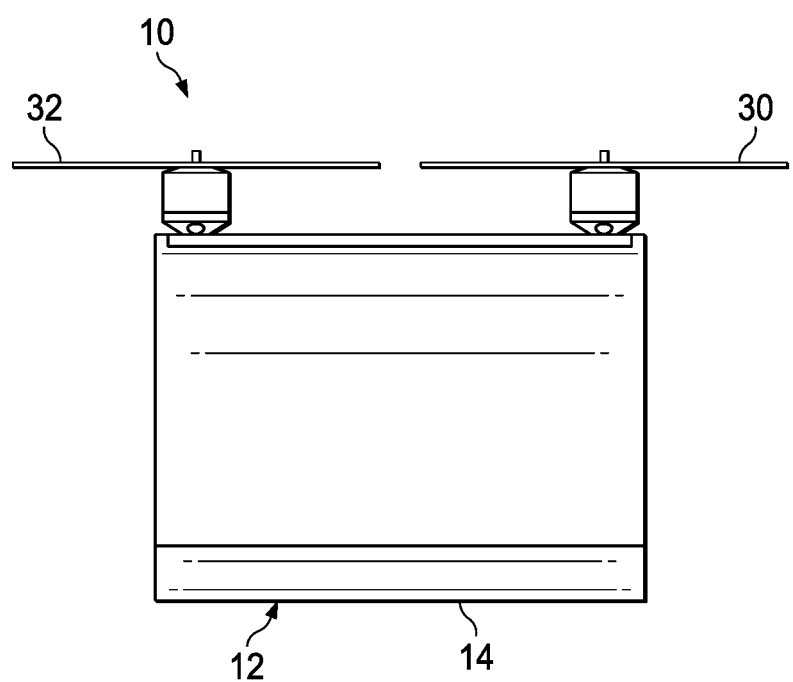

As noted, aircraft 10 includes four propulsion assemblies, two for each of wings 14, 16, that provide vertical lift for aircraft 10 in the vertical takeoff and landing (VTOL) orientation of aircraft 10, as best seen in FIG. 1F, and forward thrust for aircraft 10 in the forward flight orientation of aircraft 10, as best seen in FIG. 1A. In the illustrated embodiment, first and second upper propulsion assemblies 30, 32 are secured to upper wing 14 forward of first and second upper pivot joints 22, 24, respectively. Similarly, first and second lower propulsion assemblies 34, 36 are secured to lower wing 16 forward of first and second lower pivot joints 26, 28, respectively. As illustrated, propulsion assemblies 30, 32, 34, 36 may be positioned at the leading edge of airframe 12. In alternate embodiments, propulsion assemblies 30, 32, 34, 36 could be coupled to the trailing edge of airframe 12. In the illustrated embodiment, each of propulsion assemblies 30, 32, 34, 36 includes a rotor assembly and an electric motor powered by electricity from one or more batteries. In other embodiments, propulsion assemblies 32, 34, 36, 38 may be powered via any suitable power source, including but not limited to, internal combustion, air pressure or mechanical energy storage from a liquid fuel source, a compressed gas, a flywheel or a spring, as examples.

In addition to the specific elements shown, aircraft 10 may include other functional components, such as a sensor system. Such a sensor system may include a sensor array having one or more of an optical camera, a thermal camera, an infrared camera, a video camera, an intelligence, surveillance and reconnaissance payload, a GPS system or other desired sensors. A sensor system may provide real time images and/or video to the ground station via a communication system using a wireless communications protocol, which may be useful when aircraft 10 is operated as a soldier borne sensor. Alternately, aircraft 10 may store some or all of its recorded data onboard, to be downloaded upon landing. Further details of suitable sensor systems are described herein.

Aircraft 10 may be operated responsive to autonomous flight control, remote flight control or a combination thereof. As an example, aircraft 10 may use waypoint navigation to follow a trail of pre-programmed waypoints to accomplish its navigational goals. Alternatively or additionally, aircraft 10 may be operated responsive to assisted manual flight based upon commands received from a ground station via a communication system using a wireless communications protocol. Aircraft 10 may comprise a flight control system housed within airframe 12. Such a system may include non-transitory computer readable storage media including a set of computer instructions executable by one or more processors for controlling the operation of aircraft 10. The flight control system may be implemented on one or more general-purpose computers, special purpose computers or other machines with memory and processing capability.

Aircraft 10 is designed to be placed into multiple configurations, depending on operational demands at a particular time. In FIGS. 1A and 1C, aircraft 10 is shown in an "open" articulation suitable for flight with upper and lower wings 14, 16 having a maximum vertical dimension, with reference to the vertical axis V in FIG. 1A. In FIGS. 1B and 1D, aircraft 10 is shown in a "closed" articulation suitable for compact storage with upper and lower wings 14, 16 having a minimum vertical dimension, with reference to the vertical axis V in FIG. 1A. As used herein, the term "maximum vertical dimension" refers to the distance between upper and lower wings 14, 16 when aircraft 10 is locked in the flight mode and the term "minimum vertical dimension" refers to the distance between upper and lower wings 14, 16 when aircraft 10 is locked in the compact storage mode. In the embodiment shown in FIGS. 1A-1F, each of upper and lower wings 14, 16 has a generally planar lower surface generally defining its principal plane. It can be seen that the principal planes of upper and lower wings 14, 16 remain generally parallel to one another in both the open and closed configuration. In a similar manner, each of pylons 18, 20 has a generally planar profile defining its principal plane. Further, the principal planes of pylons 18, 20 remain generally parallel to one another in both the open and closed configurations of aircraft 10.

While the two wings 14, 16 remain parallel to one another and the two pylons 18, 20 remain parallel to one another in both articulations, the geometric relationship between the principal planes of upper and lower wings 14, 16 and the principal planes of first and second pylons 18, 20 varies substantially between the open and closed configurations of vehicle 10. As can be seen in FIGS. 1A and 1C, in the open configuration, the geometric relationship between the principal plane of wings 14, 16 and the principal plane of pylons 18, 20 is one of orthogonality. In other words, the principal planes of wings 14, 16 and pylons 18, 20 are disposed at approximately 90 degrees when aircraft 10 is in its open configuration. This configuration maximizes the vertical dimension between upper and lower wings 14, 16, thus enhancing stability and maneuverability of aircraft 10. The geometric relationship between wings 14, 16 and pylons 18, 20 is quite different in the closed configuration. As can be seen in FIGS. 1B and 1D, pylons 18, 20 have been rotated relative to wings 14, 16 such that upper and lower wings 14, 16 have shifted laterally, with reference to the lateral axis L in FIG. 1A, and have moved vertically relative to each other. The principal planes of the wings 14, 16 remain substantially parallel and the pylons 18, 20 remain substantially parallel, however, the principal planes of the wings 14, 16 and the pylons 18, 20 are no longer orthogonal to each other in the closed configuration, but are disposed at an acute angle to one another. In this closed articulation, upper wing 14, lower wing 16, pylon 18 and pylon 20 form a quadrilateral having parallelogram shaped cross section. In alternate embodiments, wings 14, 16 and pylons 18, 20 may be substantially parallel to one another in the closed configuration. In the closed configuration, the vertical distance between wings 14, 16 is at a minimum, thus facilitating compact storage.

Figure 2:
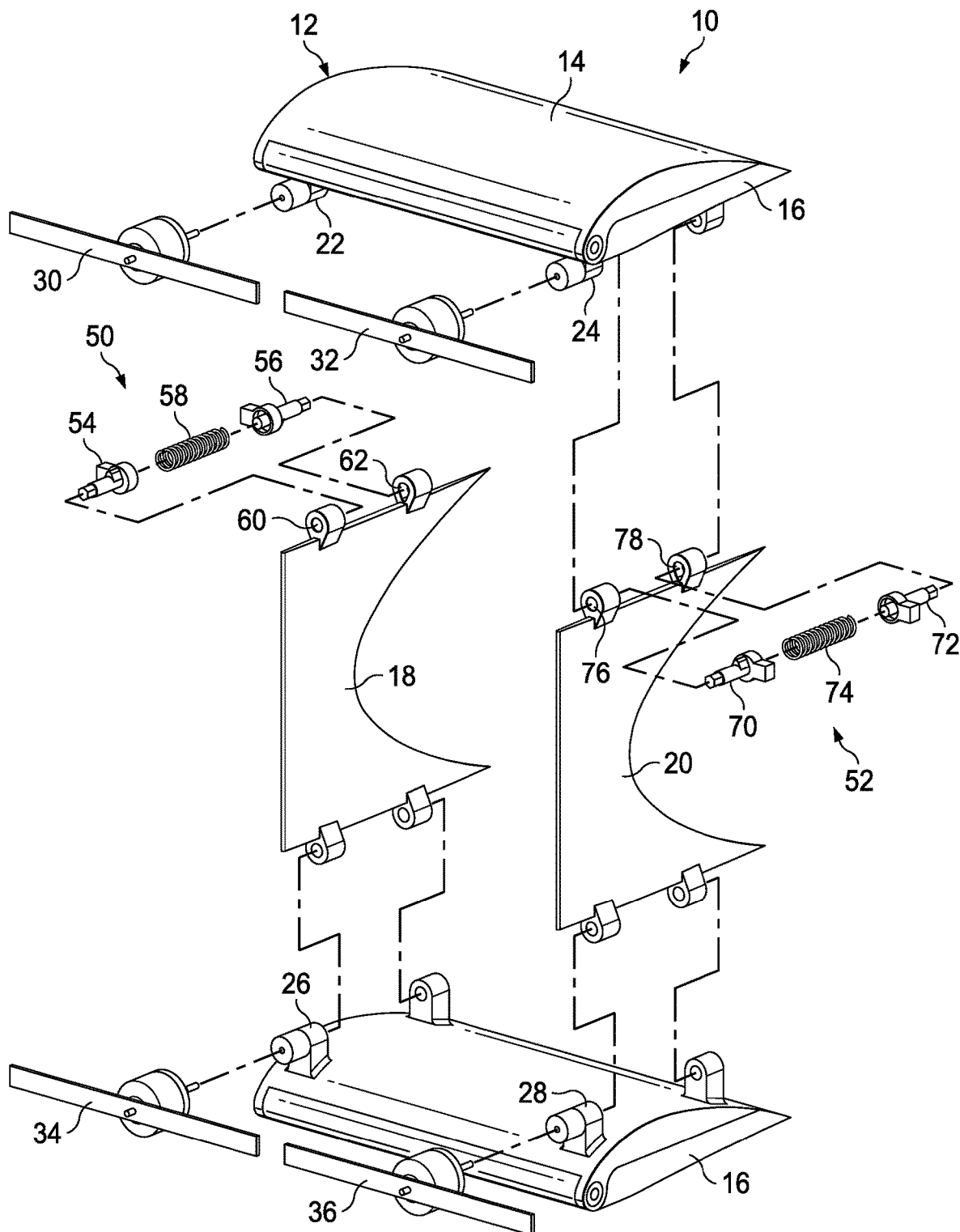
FIG. 2 is an exploded view of a compact unmanned aerial vehicle in accordance with embodiments of the present disclosure.

The exploded view of FIG. 2 further clarifies the relationship of the various components of aircraft 10 described above in connection with FIGS. 1A-1F, along with additional functional details. In the illustrated embodiment, aircraft 10 incorporates first and second pivot locks 50, 52 to lock aircraft 10 into its current configuration. Thus, when aircraft 10 is collapsed into its closed configuration, pivot locks 50, 52 hold aircraft 10 in that configuration. Conversely, pivot locks 50, 52 will hold aircraft 10 in its open configuration once it is opened. First pivot lock 50 comprises forward locking cam 54, aft locking cam 56 and compression spring 58. When assembled, forward locking cam 54 is disposed within forward aperture 60 of first pylon 18. Similarly, aft locking cam 56 is disposed within aft aperture 62 of first pylon 18. As will be described in further detail below, each of locking cams 54, 56 incorporates certain geometric features operable to fix the orientation of the airframe wings to the airframe pylons when fully extended by compression spring 58, but to allow them to rotate when compression spring 58 is compressed. Similarly, second pivot lock 52 comprises forward locking cam 70, aft locking cam 72 and compression spring 74. Forward locking cam 70 is disposed within forward aperture 76, while aft locking cam 72 is disposed within aft aperture 78. Locking cams 70, 72 are designed to lock pylon 20 in place when fully extended by compression spring 74, but to facilitate rotation when compressed together.

Referring next to FIGS. 3A-3D, details of a wing module, depicted as upper wing 14, are disclosed. Upper wing 14 is substantially similar to lower wing 16 therefore, for sake of efficiency, certain features will be disclosed only with regard to upper wing 14. One having ordinary skill in the art, however, will fully appreciate an understanding of lower wing 16 based upon the disclosure herein of upper wing 14. Upper wing 14 has an external wing skin that is formed from an upper skin 90 and a lower skin 92. Upper and lower skins 90, 92 are rotatably coupled together at a hinge joint 94 that includes two hinge joint elements, one on each side of upper wing 14. In other embodiments, other numbers of hinge joint elements may be used, both less than and greater than two. In the illustrated embodiment, hinge joint 94 is proximate the leading edge of upper wing 14 and defines a spanwise axis of rotation for upper and lower skins 90, 92.

Upper skin 90 forms an upper surface of upper wing 14 having a curved profile. Lower skin 92 forms the leading edge, the trailing edge and the lower surface of upper wing 14 with the lower surface having a generally or substantially planar profile. In the flight configuration of upper wing 14 depicted in FIGS. 3A-3D, the curved upper surface and the generally planar lower surface of upper wing 14 form an airfoil cross section to facilitate flight. As such, upper and lower skins 90, 92 provide lift responsive to the forward airspeed of aircraft 10 when upper and lower skins 90, 92 are in the flight configuration. Lower skin 92 of upper wing 14 incorporates an array of mounts on its lower surface, including forward mount 96, forward mount 98, aft mount 100 and aft mount 102. Forward mounts 96, 98 serve as mounting points for upper propulsion assemblies 30, 32 described herein. Forward and aft mounts 96, 100 serve as mounting points for first pylon 18. Forward and aft mounts 98, 102 serve as mounting points for second pylon 20. The construction of lower wing 16 is similar to the construction of upper wing 14, except that the mounting points are disposed on the upper surface of wing 16.

Figure 3A:
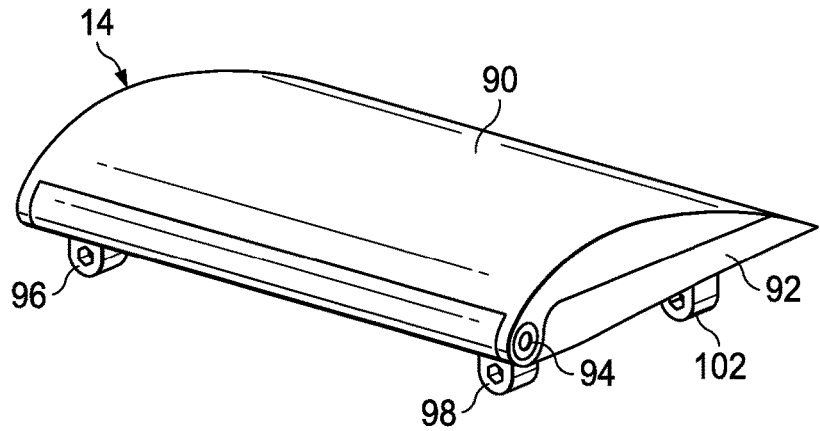
FIGS. 3A-3G are various views of a wing assembly of a compact unmanned aerial vehicle in accordance with embodiments of the present disclosure.
Figure 3B:
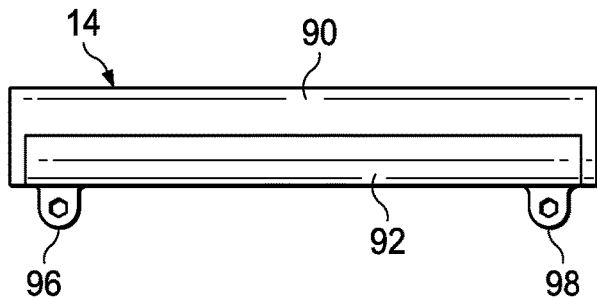
Figure 3C:
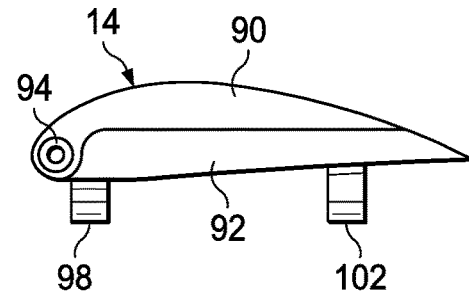
Figure 3D:
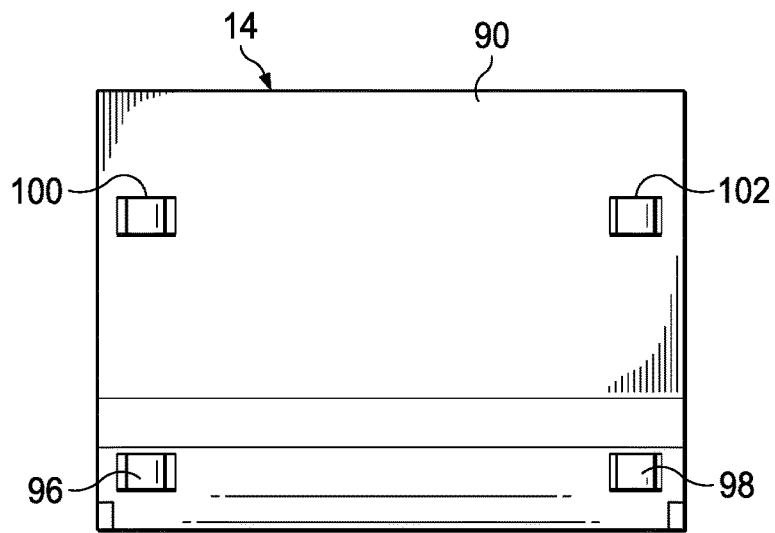
Figure 3E:
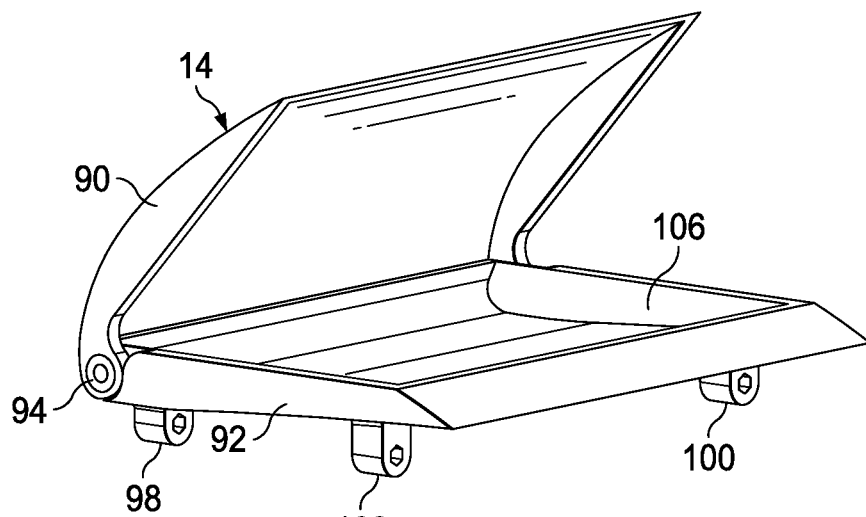
Figure 3F:
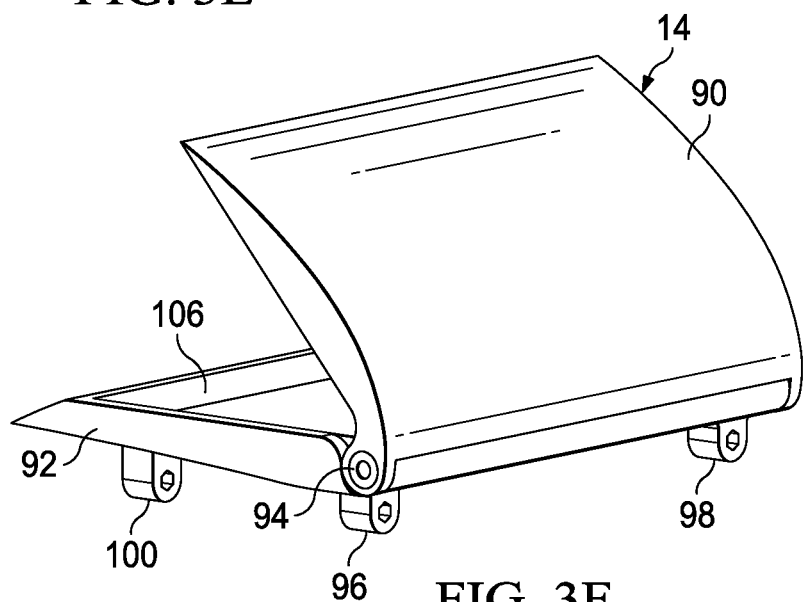
Figure 3G:
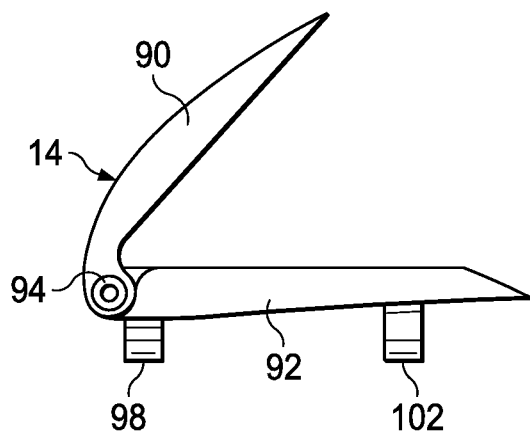
Figure 4A:
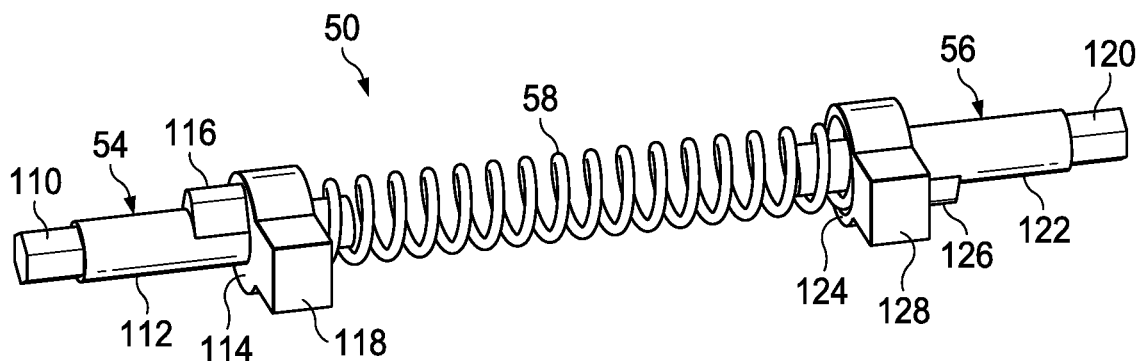
FIGS. 4A-4D are various views of a pivot locking shaft for use on a compact unmanned aerial vehicle in accordance with embodiments of the present disclosure.
Figure 4B:
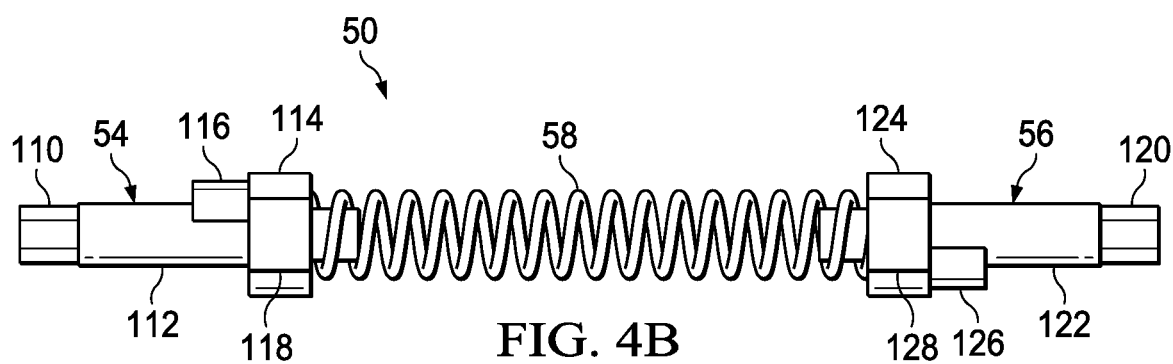
Figure 4C:
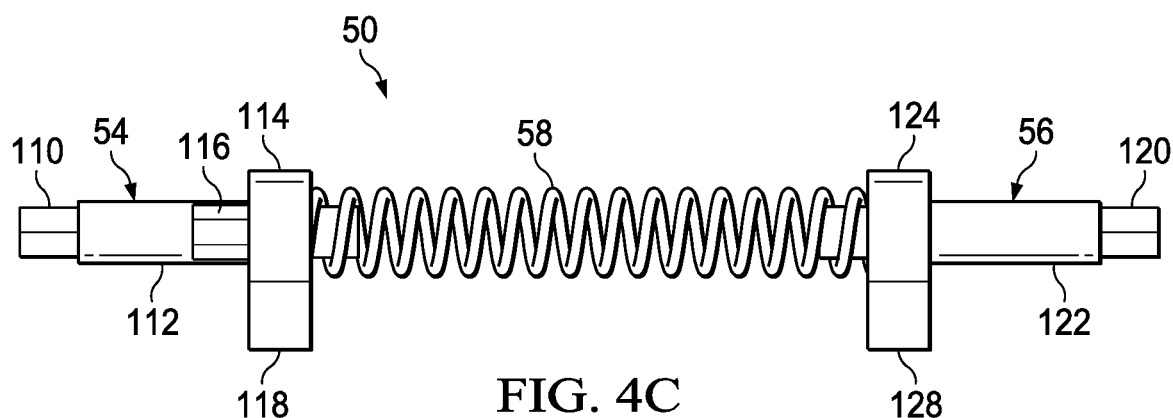
Figure 4D:
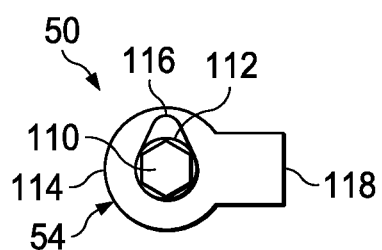

Referring additionally to FIGS. 3E-3G, upper wing 14 is depicted in its access configuration. In particular, upper skin 90 and a lower skin 92 have been rotated relative to each other about hinge joint 94 such that upper and lower skins 90, 92 are split in the chordwise direction and such that the distal ends of upper and lower skins 90, 92 are separated to facilitate access to an interior cavity 106. Interior cavity 106 may be partially or entirely formed within lower skin 92. A portion of interior cavity 106 may also be formed within upper skin 90. The flight configuration of upper wing 14 may be referred to as the closed position of upper and lower skins 90, 92, while the access configuration of upper wing 14 may be referred to as the opening position of upper and lower skins 90, 92. In the open position, a user is provided with access to some or all of the interior portion of upper wing 14. Depending on the application, interior cavity 106 may support any components that may serve the mission for which aircraft 10 may be deployed. These may include operational components such as an avionics package and/or a sensor package or non operational components such as a removable payload or combination thereof.

Although interior cavity 106 is shown as encompassing substantially the entire internal volume of upper wing 14, those of skill in the art will recognize that alternate embodiments may employ a smaller internal cavity 106. Even though a single wing module has been illustrated as forming an entire wing for aircraft 10, it should be understood by those skilled in the art that a single wing could be made up of multiple wing modules having a side-by-side relationship in which the sides of adjacent wing modules may be in contact with one another or may be separated by another portion of the wing or a fuselage. In addition, even though the present wing modules have been depicted and described with reference to aircraft 10, it should be understood by those having ordinary skill in the art that a wing module of the present disclosure could alternatively be used as all or a portion of a wing for other aircraft including, but not limited to, fixed wing aircraft, tiltrotor aircraft, tiltwing aircraft and the like.

The construction of pivot lock 50 will now be discussed with reference to FIGS. 4A-4D. Pivot lock 52 is substantially similar to pivot lock 50 therefore, for sake of efficiency, certain features will be disclosed only with regard to pivot lock 50. One having ordinary skill in the art, however, will fully appreciate an understanding of pivot lock 52 based upon the disclosure herein of pivot lock 50. As noted above, pivot lock 50 comprises forward lock cam 54, aft lock cam 56 and compression spring 58. Working together in concert with mating features incorporated into upper wing 14 and pylon 18, pivot lock 50 secures the articulation of pylon 18 relative to wing 14 when compression spring 58 is extended, while allowing for rotation of pylon 18 relative to wing 14 when compression spring 58 is compressed. Forward lock cam 54 incorporates an anti-rotation tip, depicted as hexagonal tip 110, disposed on the outboard end of shank 112, having a generally cylindrical profile. Base 114, also having a generally cylindrical profile, is disposed on the inboard end of shank 112. Lobe 116, having a generally prismatic shape, is disposed on the periphery of shank 112 adjacent to base 114. Compression tang 118, having a generally rectangular profile, is disposed at the periphery of base 114. Shank 112 is shaped and sized to extend through aperture 60 of first pylon 18 with lobe 116 mating with a matching alignment feature of aperture 60. Hexagonal tip 110 is shaped and sized to mate with an anti-rotation aperture, depicted as hexagonal aperture 96, in upper wing 14 when compression spring 58 is extended, thereby locking the orientation between upper wing 14 and pylon 18.

Aft lock cam 56 incorporates an anti-rotation tip, depicted as hexagonal tip 120, disposed on the outboard end of shank 122, having a generally cylindrical profile. Base 124, also having a generally cylindrical profile, is disposed on the inboard end of shank 122. Lobe 126, having a generally prismatic shape, is disposed on the periphery of shank 122 adjacent to base 124. Compression tang 128, having a generally rectangular profile, is disposed at the periphery of base 124. Shank 122 is shaped and sized to extend through aperture 62 of first pylon 18 with lobe 126 mating with a matching alignment feature of aperture 62. Hexagonal tip 120 engages with an anti-rotation aperture, depicted as hexagonal aperture 100, in upper wing 14 when compression spring 58 is extended. In the illustrated embodiment, lobe 116 of forward lock cam 54 is positioned 180 degrees out of phase relative to lobe 126 of aft lock cam 56. In other embodiments, lobe 116 of forward lock cam 54 may be positioned in other out of phase positions relative to lobe 126 of aft lock cam 56 or lobe 116 of forward lock cam 54 may be positioned in phase relative to lobe 126 of aft lock.

Pivot lock 50 thus couples first pylon 18 to upper wing 14 and selectively allows and prevents relative rotation therebetween. Specifically, forward lock cam 54, aft lock cam 56 and compression spring 58 operate to fix the position of pylon 18 relative to upper wing 14 whenever compression spring 58 is extended. When spring 58 is compressed, and lock cams 54, 56 are disengaged from their mating relationship with apertures 96, 98 of upper wing 14, pylon 18 may be freely rotated about pivot joint 22. In this manner, aircraft 10 may be converted from the open articulation to the closed articulation, or vice versa, by compressing spring 58 of pivot lock 50 and compressing spring 74 of pivot lock 52 to enable relative rotation of pylons 18, 20 relative to upper wing 14. In the illustrated embodiment, lower pivot joints 26, 28 rotatably couple lower wing 16 to pylons 18, 20 such that relative rotation is allowed. Thus, actuation of pivot locks 50, 52 enables articulation of aircraft 10. In other embodiments, similar pivot locks may be associated with lower pivot joints 26, 28.

Figure 5A:
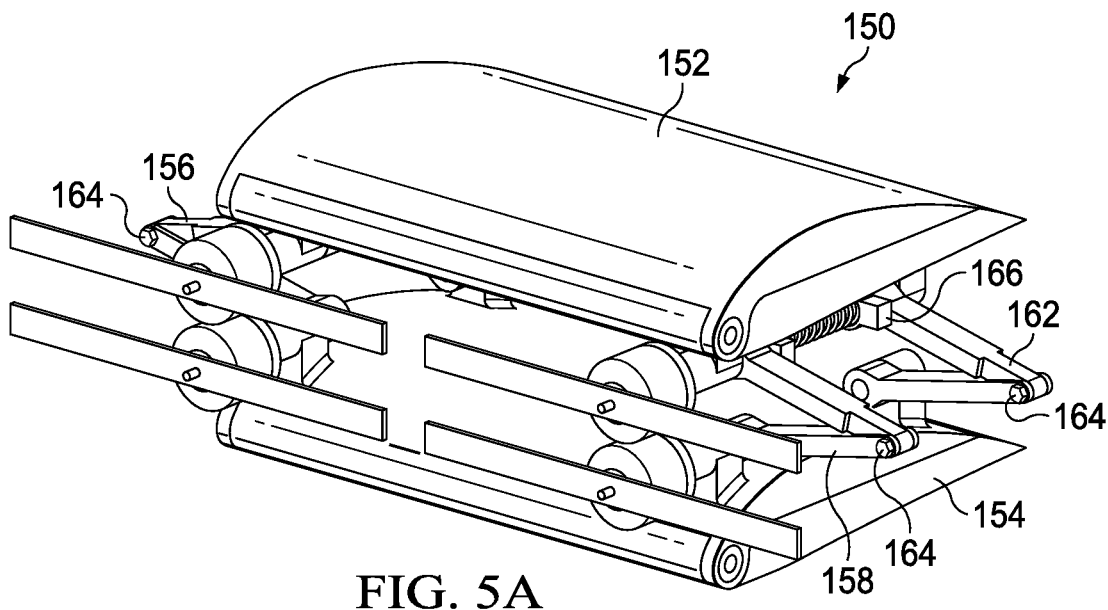
FIGS. 5A-5B are schematic illustrations of a compact unmanned aerial vehicle in accordance with embodiments of the present disclosure.
Figure 5B:
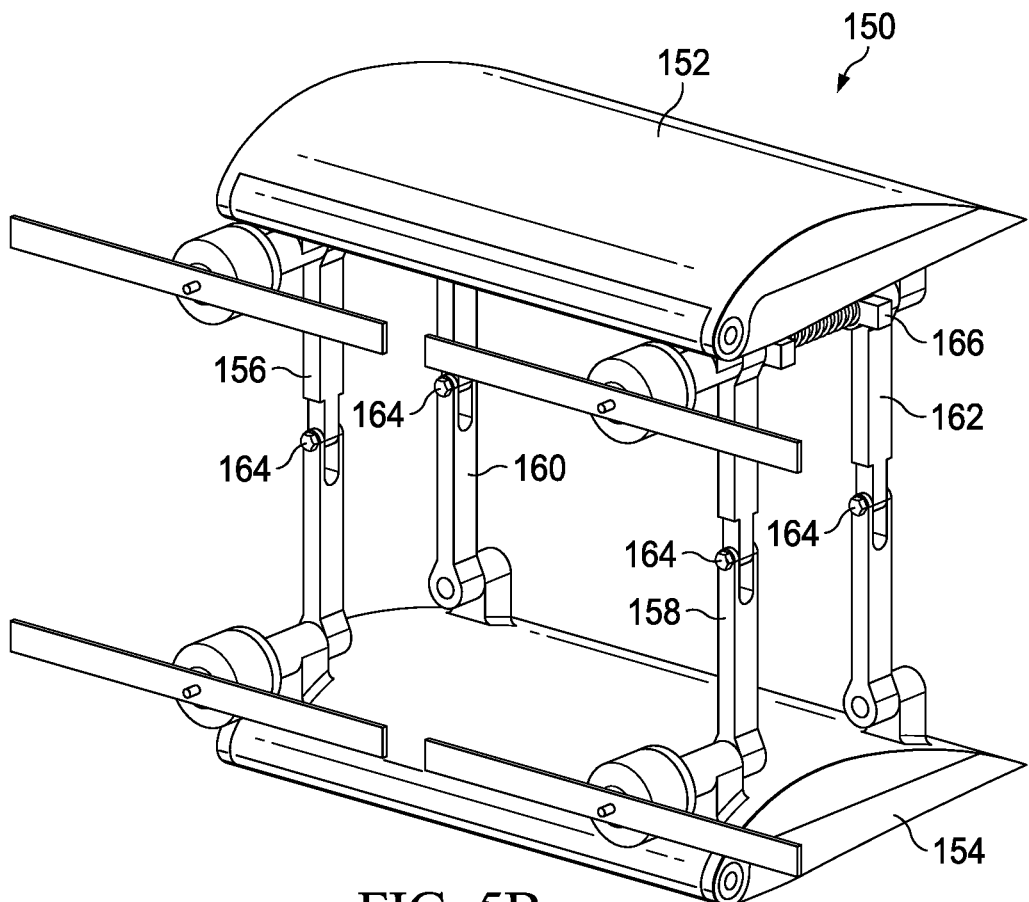

Even though a particular articulation geometry has been depicted and described, it should be understood by those having ordinary skill in the art that articulation between a flight mode and a compact storage mode of an aircraft may be accomplished in a variety of ways. For example, as best seen in FIGS. 5A-5B, aircraft 150 incorporates upper wing 152 and lower wing 154 connected by an array of four pylons 156, 158, 160, 162. In contrast to pylons 18, 20 of aircraft 10 shown and described above, each of pylons 156, 158, 160, 162 incorporates a hinge joint 164 at its midpoint. Hinge joints 164 allow for aircraft 150 to be opened and closed by translating wings 152, 154 along a vertical axis V (see FIG. 1A) that is generally orthogonal to the principal planes of wings 152, 154 between a maximum vertical dimension, in the flight mode depicted in FIG. 5B, and a minimum vertical dimension, in the compact storage mode depicted in FIG. 5A. In this embodiment, pylons 156, 158, 160, 162 extend in the outboard direction when aircraft 150 is closed. Aircraft 150 may be locked in the open and the closed articulations using pivot locks 166 (only one pivot lock being visible in the figures) in a manner similar to the operation of pivot locks 50, 52 discussed above, either alone or in combination with locking features of hinge joints 164, such as tightening and loosening hinge joints 164 to prevent and allow rotation thereof. The operation and functionality of aircraft 150 are otherwise substantially similar to those of aircraft 10.

Figure 6A:
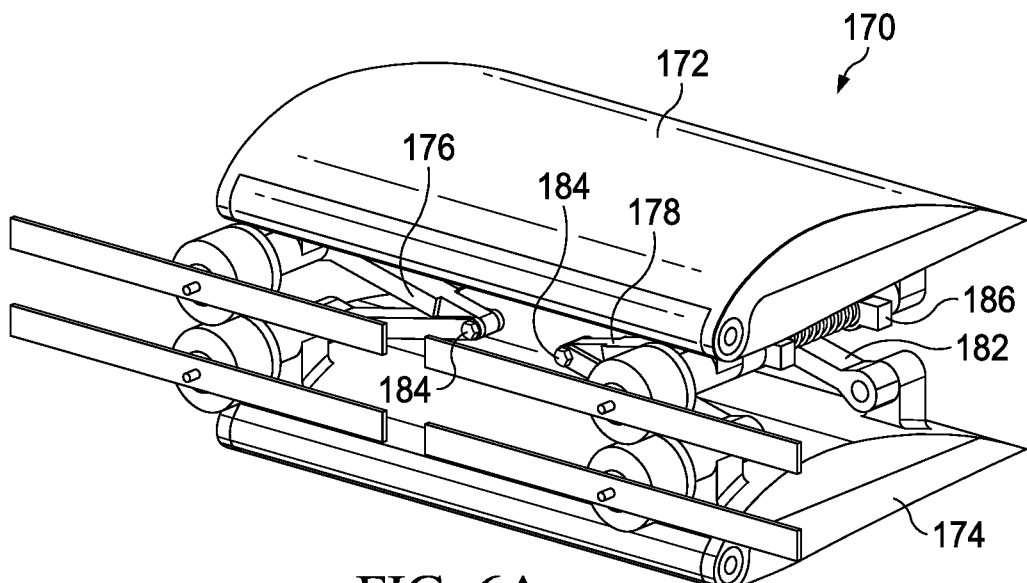
FIGS. 6A-6B are schematic illustrations of a compact unmanned aerial vehicle in accordance with embodiments of the present disclosure.
Figure 6B:
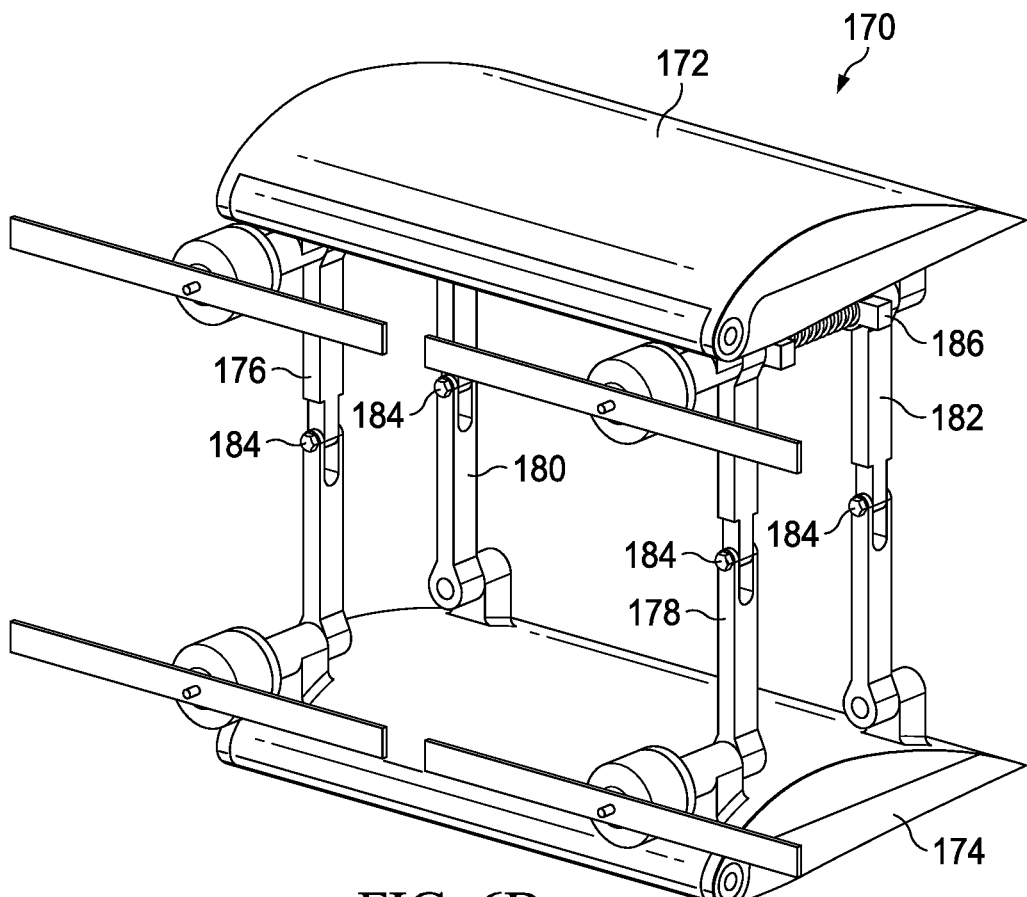

Aircraft 170, shown in FIGS. 6A-6B, is very similar to aircraft 150. Aircraft 170 incorporates upper wing 172 and lower wing 174 connected by an array of four pylons 176, 178, 180, 182. In contrast to pylons 18, 20 of aircraft 10 shown and described above, and similar to the construction of aircraft 150, each of pylons 176, 178, 180, 182 incorporates a hinge joint 184 at its midpoint. Hinge joints 184 allow for aircraft 170 to be opened and closed by translating wings 172, 174 along a vertical axis V (see FIG. 1A) that is generally orthogonal to the principal planes of wings 172, 174 between a maximum vertical dimension, in the flight mode depicted in FIG. 6B, and a minimum vertical dimension, in the compact storage mode depicted in FIG. 6A. In this embodiment, pylons 176, 178, 180, 182 extend in the inboard direction when aircraft 170 is closed. Aircraft 170 may be locked in the open and the closed articulations using pivot locks 186 (only one pivot lock being visible in the figures) in a manner similar to the operation of pivot locks 50, 52 discussed above, either alone or in combination with locking features of hinge joints 184, such as tightening and loosening hinge joints 184 to prevent and allow rotation thereof. The operation and functionality of aircraft 170 are otherwise substantially similar to those of aircraft 10 and aircraft 150.

Figure 7A:
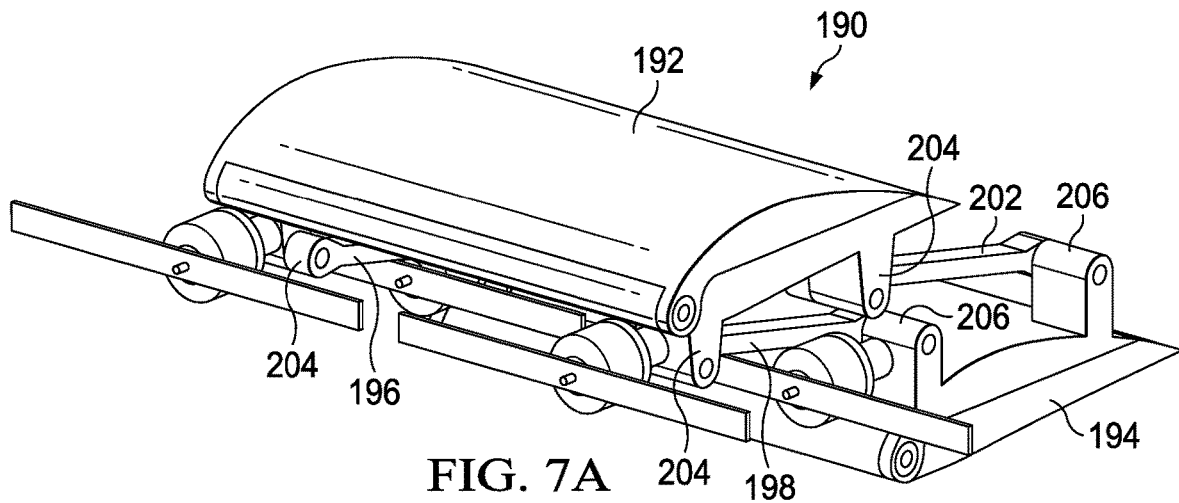
FIGS. 7A-7B are schematic illustrations of a compact unmanned aerial vehicle in accordance with embodiments of the present disclosure.
Figure 7B:
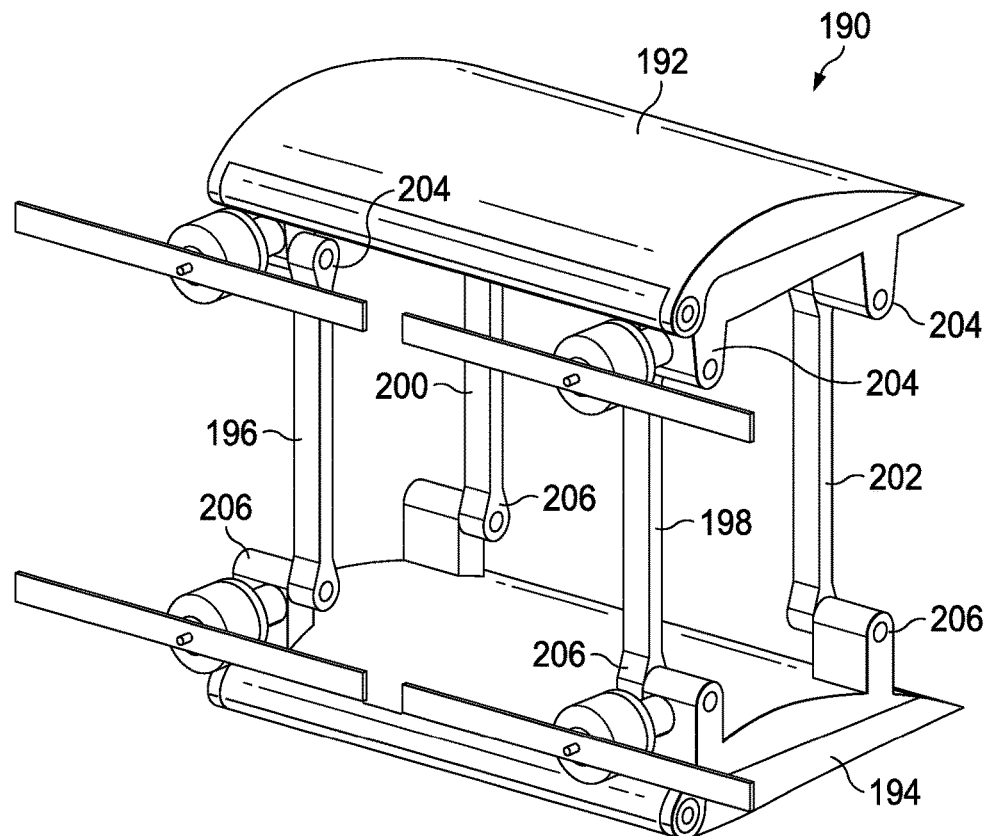

The foregoing embodiments have employed pylons pivoting about axes generally parallel to the direction of flight, but there is nothing within the spirit and scope of the present disclosure that is limited to that geometry. FIGS. 7A-7B depict an aircraft 190 incorporating upper wing 192 and lower wing 194 connected by pylons 196, 198, 200, 202, which are distinct from the pylons of the foregoing embodiments owing to different axes of rotation. Whereas the pylons in the embodiments set forth above have been designed to pivot sideways or transverse to the direction of flight, pylons 196, 198, 200, 202 pivot along the direction of flight about pivot joints 204, 206. When pylons 196, 198, 200, 202 rotate relative to upper and lower wings 192, 194, upper and lower wings 192, 194 shift fore-aft (see fore-aft axis F/A in FIG. 1A) and move vertically relative to each other between a maximum vertical dimension, in the flight mode depicted in FIG. 7B, and a minimum vertical dimension, in the compact storage mode depicted in FIG. 7A. Aircraft 190 may be locked in the open and the closed articulations using locking features of pivot joints 204 and/or pivot joints 206. Otherwise, aircraft 190 is substantially similar to aircraft 10.

Figure 8A:
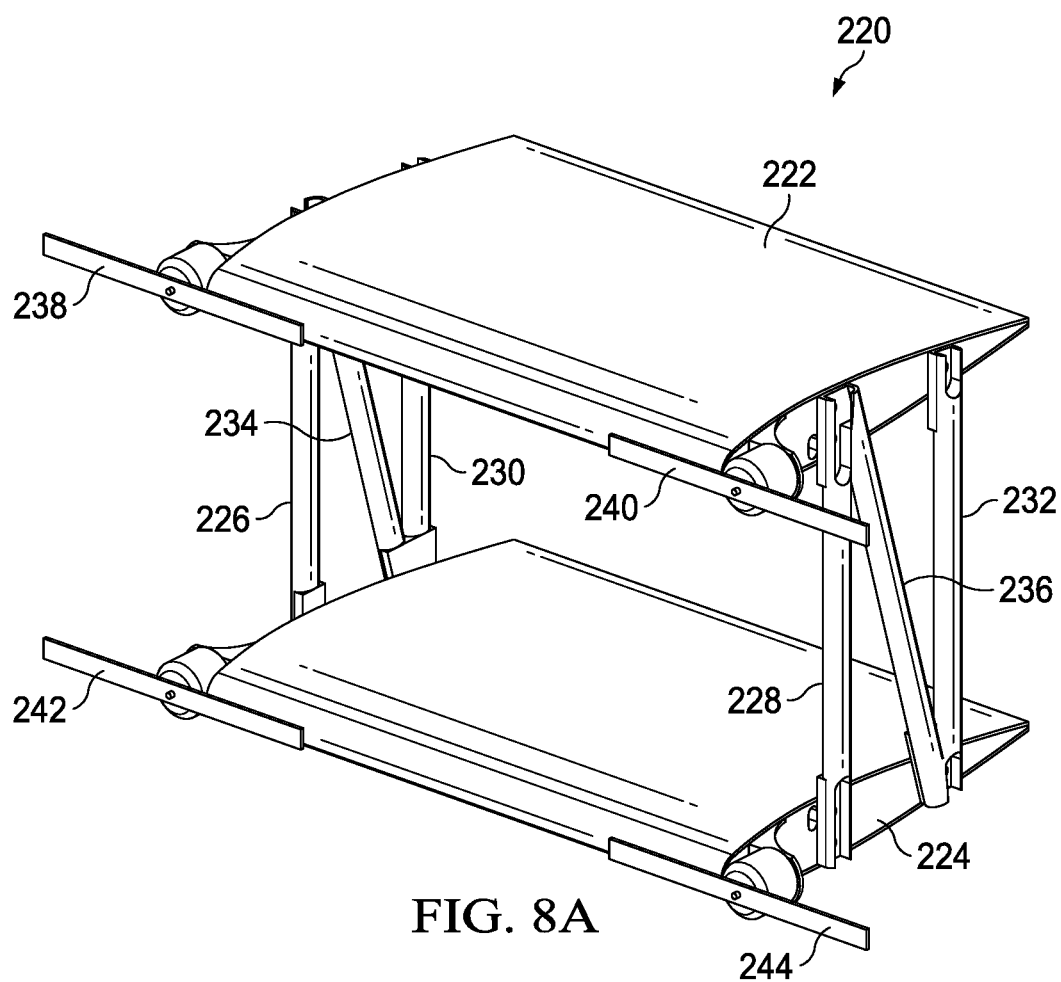
FIGS. 8A-8C are schematic illustrations of an unmanned aerial vehicle in accordance with embodiments of the present disclosure.
Figure 8B:
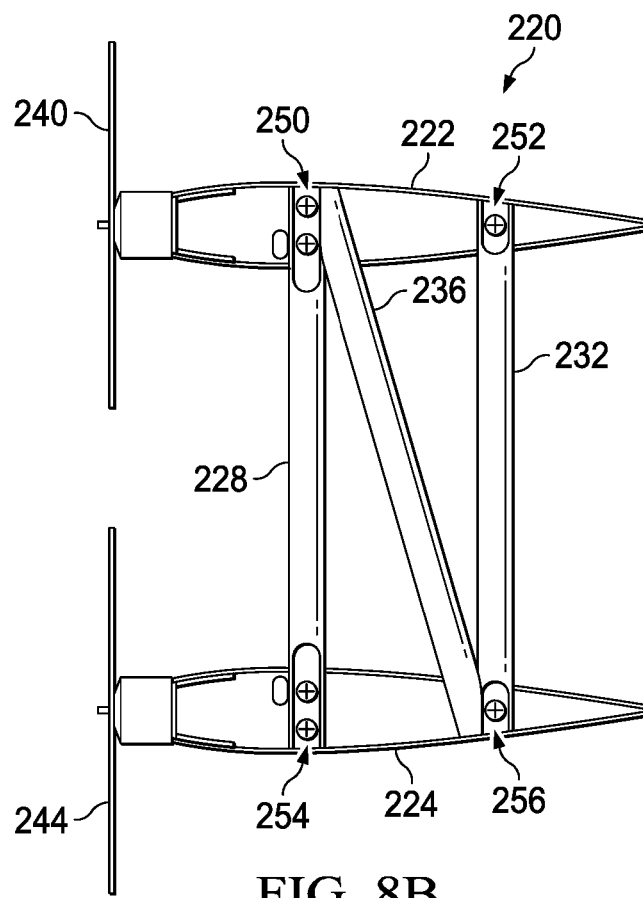
Figure 8C:
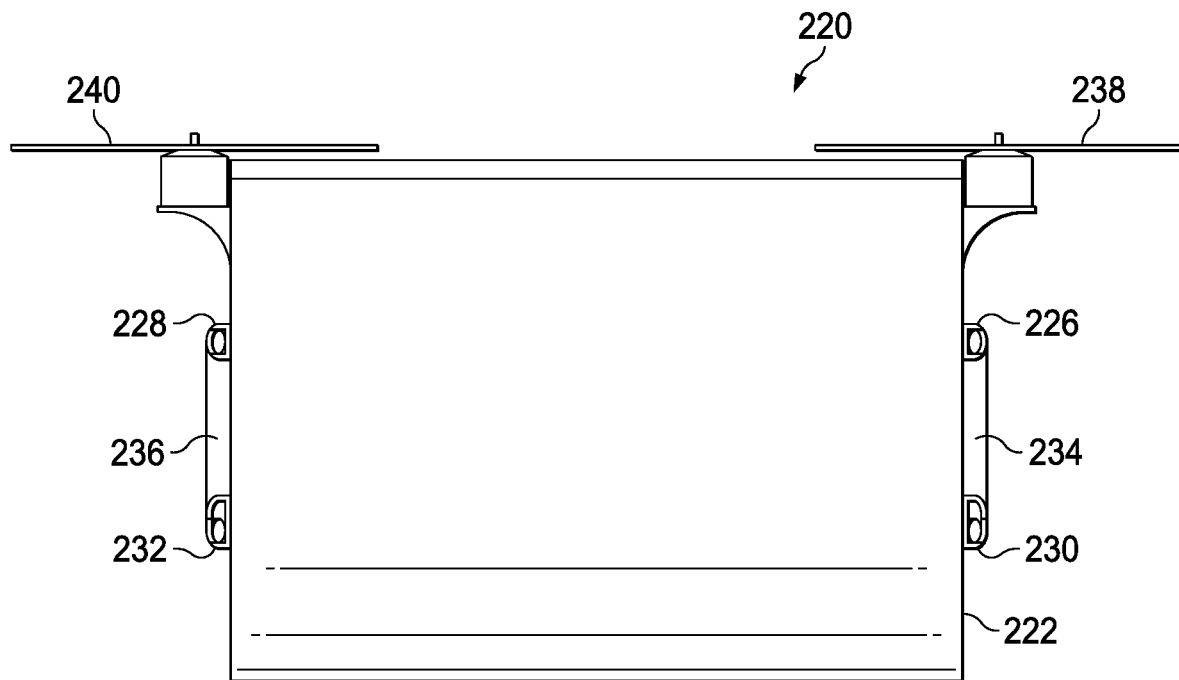

Referring next to FIGS. 8A-8C, an unmanned aerial vehicle is depicted and referred to herein as aircraft 220. Aircraft 220 has a modular airframe that incorporates upper wing 222 and lower wing 224 connected by a network of pylons. Upper and lower wings 222, 224 each have an airfoil cross section and may have a generally or substantially planar lower surface. In the illustrated embodiment, forward pylons 226, 228 extend between forward sections of wings 222, 224, aft pylons 230, 232 extend between aft sections of wings 222, 224 and intermediate pylons 234, 236 extend between forward sections of wing 222 and aft sections of wing 224 to provide structural integrity to aircraft 220. In the illustrated embodiment, upper and lower wings 222, 224 are substantially parallel and pylons 226, 230, 234 are substantially parallel with pylons 228, 232, 236 such that the airframe has a substantially rectangular cross section. Aircraft 220 has a two-dimensional distributed thrust array including four propulsion assemblies 238, 240, 242, 244 that are independently operated and controlled by the flight control system of aircraft 220. In the illustrated embodiment, two propulsion assemblies are operably associated with each wing 222, 224 to provide vertical lift for aircraft 220 in the vertical takeoff and landing (VTOL) orientation of aircraft 220, as best seen in FIG. 8C, and forward thrust for aircraft 220 in the forward flight orientation of aircraft 220, as best seen in FIGS. 8A-8B.

Figure 9:
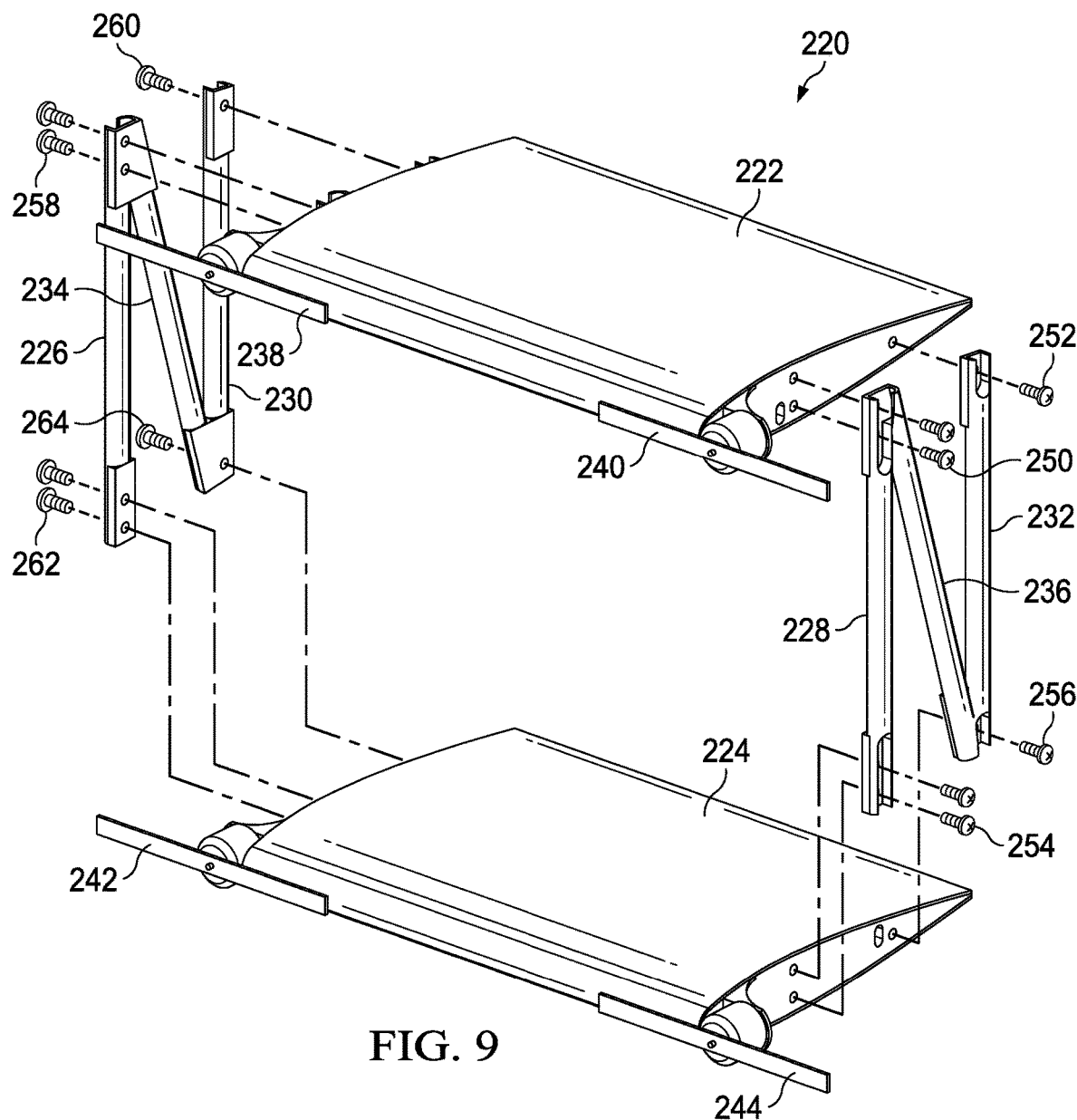
FIG. 9 is an exploded view of an unmanned aerial vehicle in accordance with embodiments of the present disclosure.

Pylons 228, 232, 236 are secured to upper wing 222 and lower wing 224 at an array of connection points, which include connections depicted as threaded fasteners 250, 252, 254, 256. A corresponding array of connections 258, 260, 262, 264 secures pylons 226, 230, 234 to wings 222, 224 on the opposite side of aircraft 220, as best seen in FIG. 9. Even though the connections between the pylons and the wings of the present embodiment have been depicted and described as threaded fasteners, those of ordinary skill in the art will recognize that the pylons and wings of other embodiments may be secured by any suitable fastening method without departing from the spirit and scope of the present disclosure.

Figure 10:
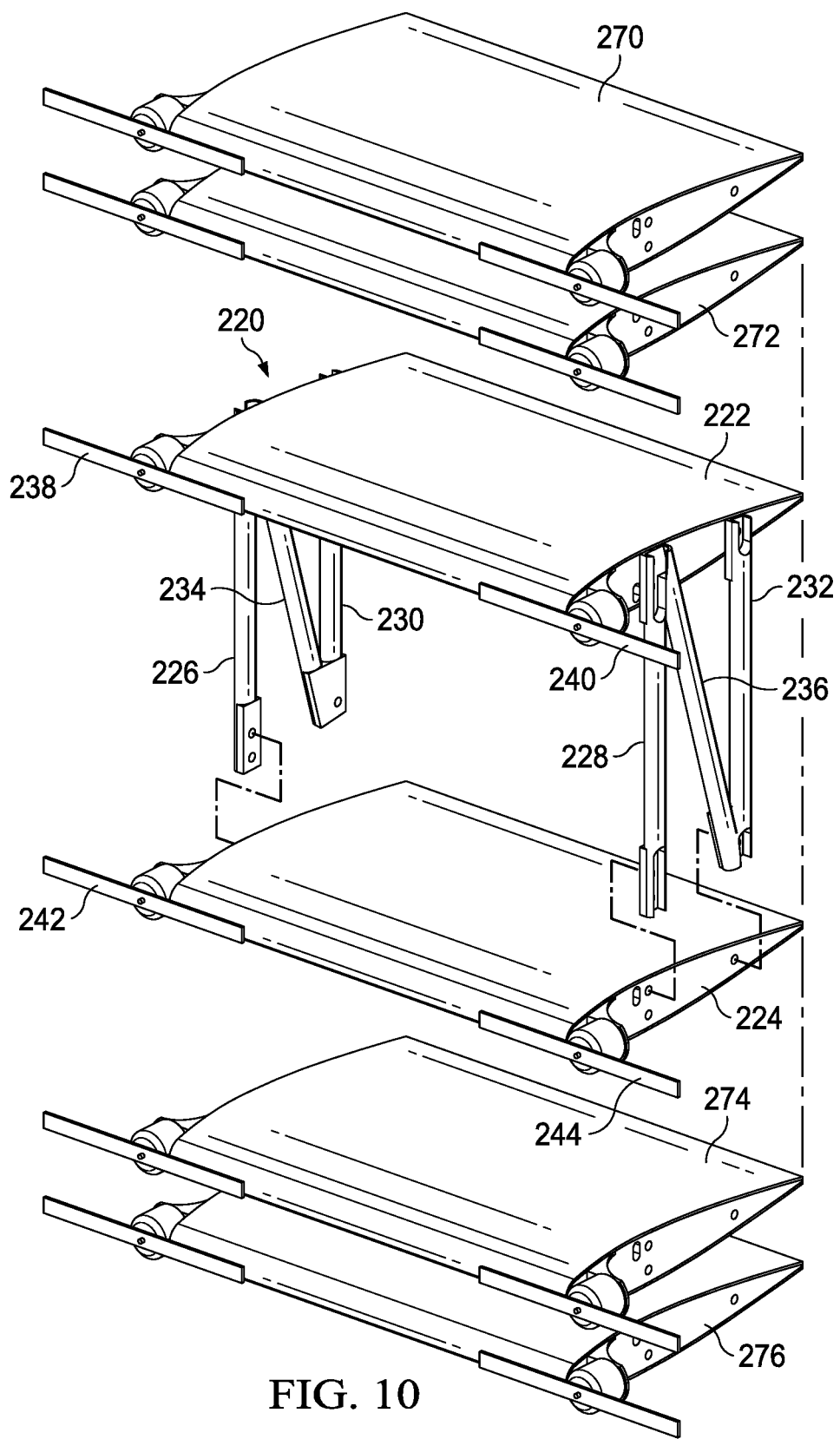
FIG. 10 is an exploded view of an unmanned aerial vehicle in accordance with embodiments of the present disclosure depicting alternate wing modules.

Referring additionally to FIG. 10, therein is depicted a plurality of wing modules each having a respective function that may be interchangeably used as the upper and lower wings of the modular airframe to provide rapid and efficient customization of aircraft 220 for various missions. For example, wing modules 222, 270, 272 may represent a plurality of upper wing modules and wing modules 224, 274, 276 may represent a plurality of lower wing modules. The functionality of the plurality of upper wing modules and the plurality of lower wing modules may vary according to the specific mission to which aircraft 220 may be assigned. This allows upper and lower wing modules to be "mixed and matched" to quickly optimize aircraft 220 for a specific mission. For example, the plurality of upper wing modules and/or the plurality of lower wing modules may include individual wing modules with specific functionalities such as navigation system wing modules, autonomous navigation system wing modules, remote navigation system wing modules, sensor system wing modules, communication system wing modules, cargo storage wing modules, flight control system and electric power system wing modules and combinations or permutations thereof including wing modules having more than one functionality.

In one implementation, aircraft 220 may require a navigation system wing module as the upper wing module. In this case, the upper wing module selected from the plurality of upper wing modules may have a general purpose navigation system therein. The general purpose navigation system may provide a certain degree of remote control, along with a certain degree of autonomous operation, thus being capable of operating in either mode, but not optimized for either role. Alternatively, for a mission in which aircraft 220 may require specialized navigation capabilities, the upper wing module selected from the plurality of upper wing modules may be a remote navigation system wing module optimized for remote control, with limited autonomous capability, if any. On the other hand, the upper wing module selected from the plurality of upper wing modules may be an autonomous navigation system wing modules optimized for autonomous navigation, with limited remote control capability, if any.

In another implementations, aircraft 220 may require a sensor system wing module as the lower wing module. In this case, the lower wing module selected from the plurality of lower wing modules may incorporate a combination of visible and infrared cameras, radio antennas and similar sensors to acquire general data about the current operating environment. For certain missions, however, optical data may be the critical data and other signals may be unimportant. In this situation, the lower wing module selected from the plurality of lower wing modules may incorporate one or more specialized, high-resolution cameras mated to high-magnification lenses. In an alternate mission, radio data may be critical, while optical data may be unimportant. In this situation, the lower wing module selected from the plurality of lower wing modules may incorporate one or more high-gain antennas tuned to the frequencies of the radio signals to be acquired. The use of the modular airframe of the present disclosure thus facilitates quick and efficient mission specific optimization of aircraft 220. As should be apparent to those having ordinary skill in the art, the modular airframe of the present disclosure provides any number of combinations, permutations and/or variations depending upon the mission requirements.

Those of skill in the art will appreciate that, although the modular concept using interchangeable wing modules has been described in connection with rigid connecting pylons for the sake of simplicity, there is nothing within the spirit and scope of the present disclosure requiring the wing modules to be limited to such constructions. For example, any of the special-purpose wing modules depicted in FIGS. 8A-10 may be incorporated into any of the articulable aircraft depicted in FIGS. 1A-7B.

Figure 11:
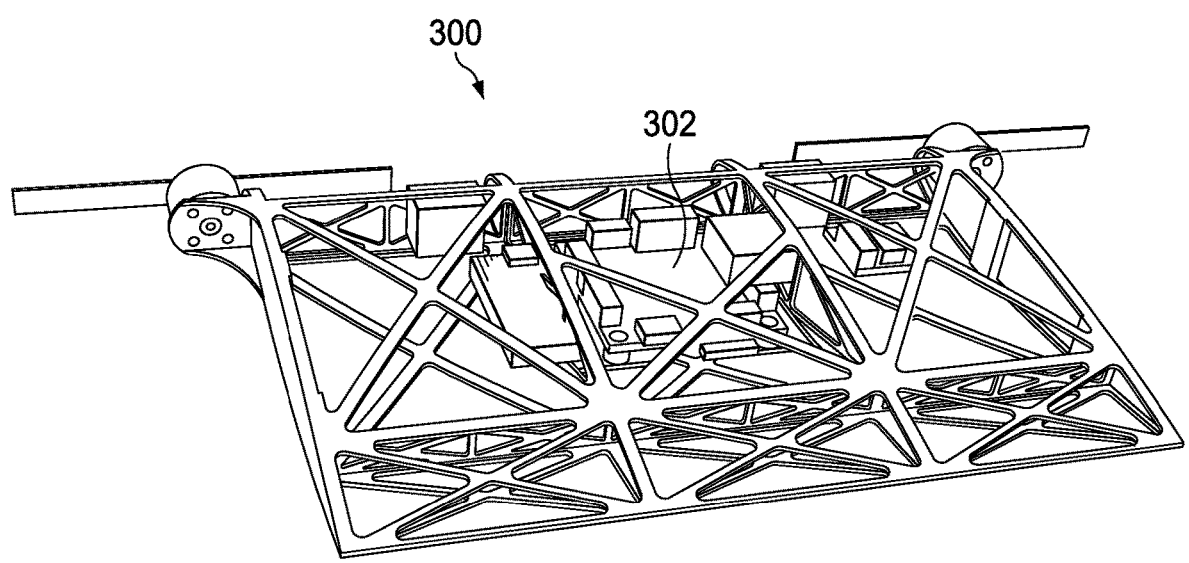
FIG. 11 is a schematic illustration of a wing module depicting an electronics module disposed inside of the wing structure for an unmanned aerial vehicle in accordance with embodiments of the present disclosure.

The internal structure of one embodiment of a wing 300 is depicted in FIG. 11. Wing 300 and/or the components parts thereof may be used with any aircraft embodiment discussed herein. The upper and lower skins have been removed from wing 300 to reveal wing substructure as well as the avionics 302 and other systems incorporating various functions of the aircraft. These systems may include, but are not limited to, a flight control system, an electric power system, a navigation system, a communication system and a sensor system, as examples. The function and interaction of these modules is described in detail below.

Figure 12:
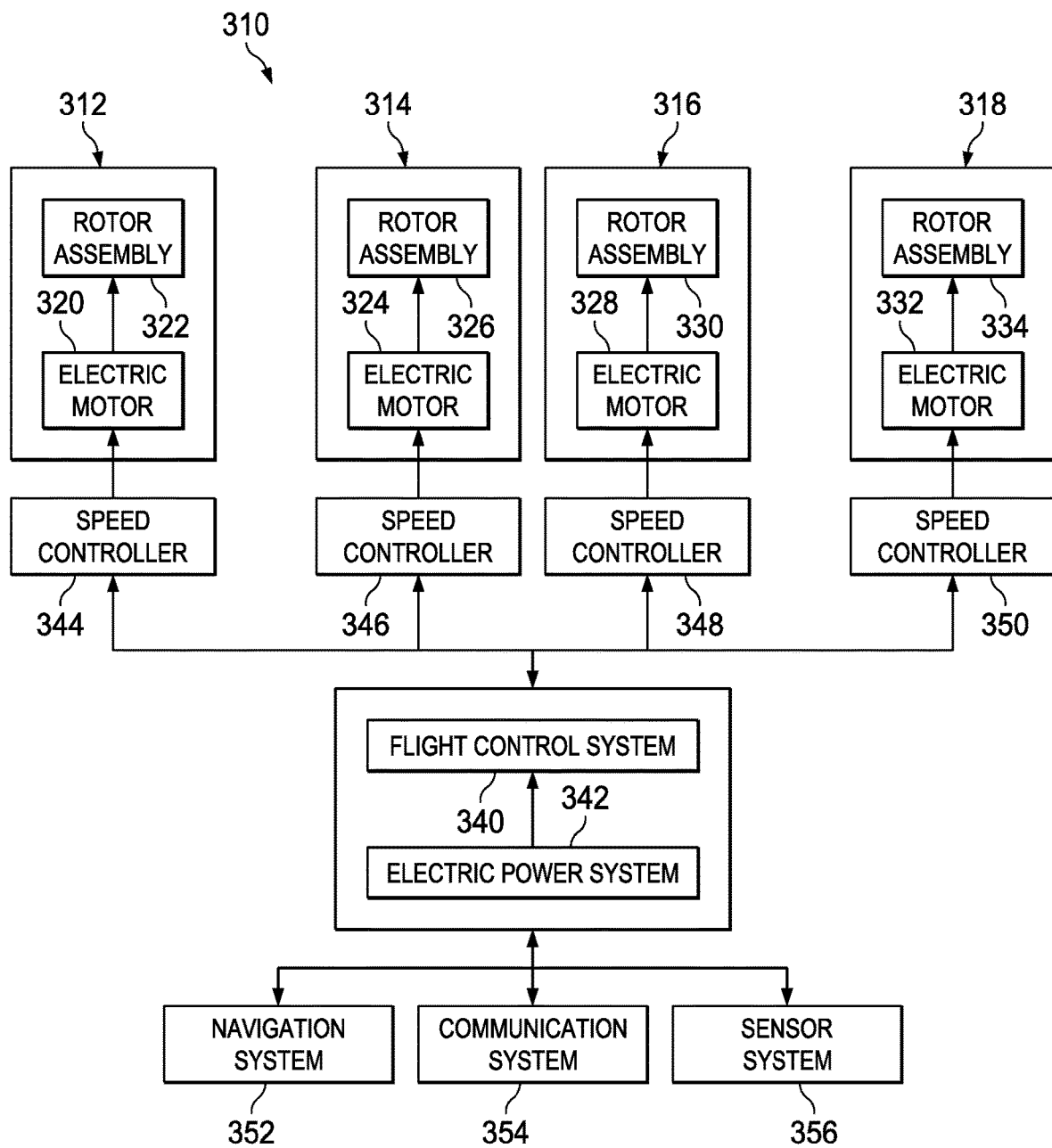
FIG. 12 is a block diagram depicting operational components of a propulsion and flight control system for an unmanned aerial vehicle in accordance with embodiments of the present disclosure.
Figure 13:
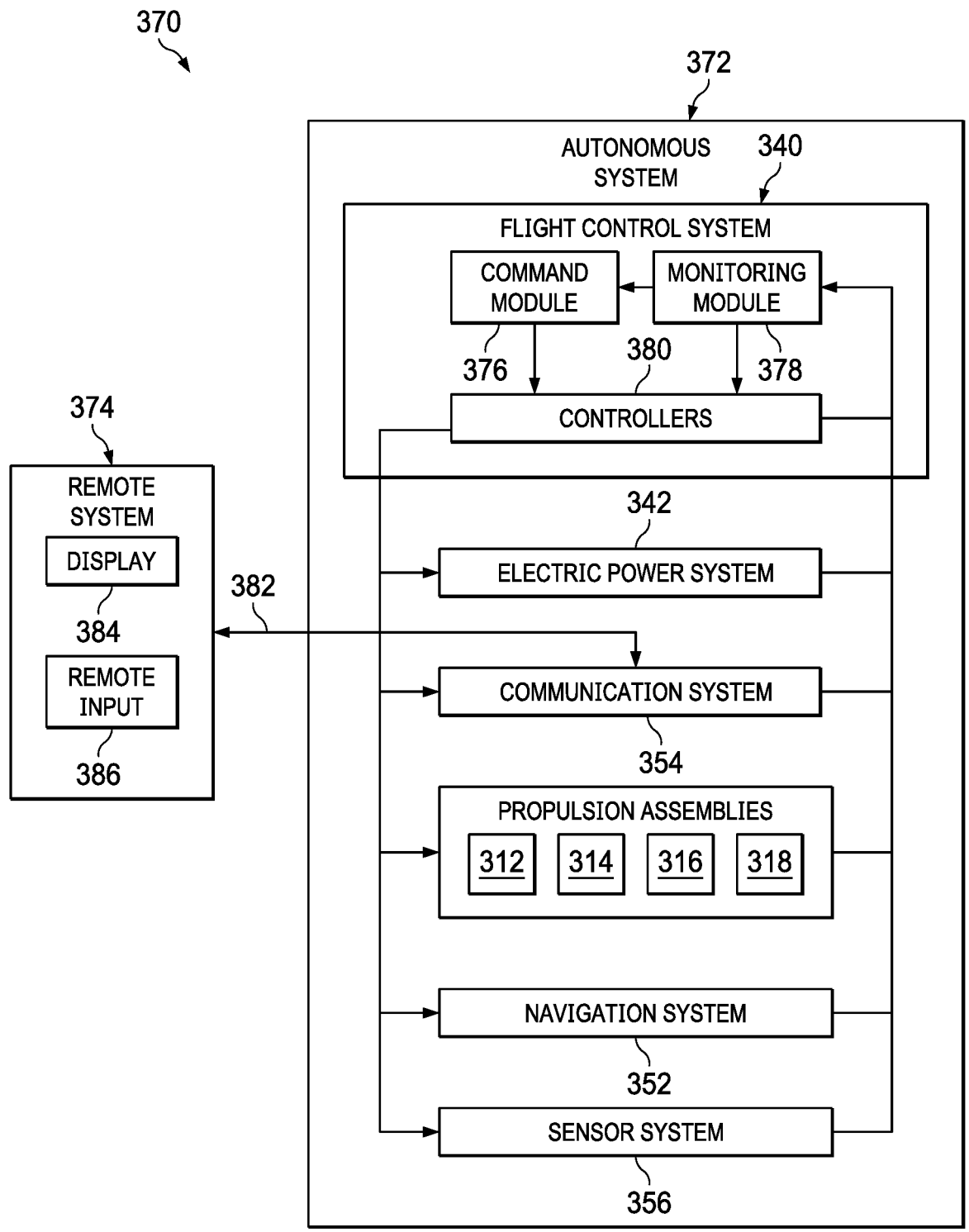
FIG. 13 is a block diagram depicting a navigation system for an unmanned aerial vehicle in accordance with embodiments of the present disclosure.

Referring additionally to FIGS. 12-13, these block diagrams show certain operational components of an unmanned aerial vehicle and the interconnections therebetween. Those of skill in the art will understand that these components may apply to any of the aircraft depicted and described in the present disclosure. Further, those of skill in the art will recognize that these components may, and often will, be housed in separate wing modules. As described above, the navigational components may be housed in one wing module while the sensory components may be housed in a separate wing module. The foregoing description is directed to the assembled aircraft as a whole.

Referring specifically to FIG. 12, an unmanned aerial vehicle is depicted and referred to herein as aircraft 310. In the illustrated embodiment, aircraft 310 has a two-dimensional distributed thrust array including four propulsion assemblies 312, 314, 316, 318 that are independently operated and controlled by the flight control system of aircraft 340, such as a digital flight control computer, that preferably includes non-transitory computer readable storage media including a set of computer instructions executable by one or more processors for controlling the operation of aircraft 310. Flight control system 340 may be implemented on one or more general-purpose computers, special purpose computers or other machines with memory and processing capability. For example, flight control system 340 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 340 may be a microprocessor-based system operable to execute program code in the form of machine-executable instructions. In addition, flight control system 340 may be selectively connectable to other computer systems via a suitable communication network that may include both wired and wireless connections.

Flight control system 340 is operably associated with an electric power system 342, which may incorporate batteries and a power controller. Preferably, the batteries are rechargeable batteries and/or easily replaceable batteries that provide aircraft 310 with thirty to sixty minutes or more of flight time at tens or hundreds of feet in the air. Electric power system 342 provides electrical energy to the various systems of aircraft 310 including propulsion assemblies 312, 314, 316, 318, flight control system 340, electronic speed controllers 344, 346, 348, 350, a navigation system 352 such as a GPS module, a communication system 354 and a sensor system 356. Flight control system 340 of aircraft 310 may be operated responsive to autonomous flight control, remote flight control or a combination thereof. For example, flight control system 340 may use waypoint navigation to follow a trail of preprogramed waypoints to accomplish a desired mission. Alternatively or additionally, flight control system 340 may be operated responsive to assisted manual flight based upon commands received from a ground station via communication system 354 using a wireless communications protocol. During assisted manual flight, aircraft 310 may be limited to flight within a line of sight communications range.

In the illustrated embodiment, sensor system 356 is controlled by flight control system 340. In other embodiments, sensor system 356 may utilize an independent control system. Sensor system 356 may include a sensor array having one or more of an optical camera, a thermal camera, an infrared camera, a video camera, an intelligence, surveillance and reconnaissance module and/or other desired sensors. For example, sensor system 356 may include a forward pointing camera and/or a downward pointing camera when aircraft 310 is in the flying wing orientation. Sensor system 356 may provide real time images and/or video to the ground station via communication system 354 using a wireless communications protocol, which may be useful when aircraft 310 is operated as a soldier borne sensor. Alternatively or additionally, sensor system 356 may capture and store information during a mission for download after the mission.

In the illustrated embodiment, flight control system 340 communicates via a wired communications network with the various systems of aircraft 310. In other embodiments, flight control system 340 could communicate with the various systems of aircraft 310 via a wireless communications network. During flight operations, flight control system 340 sends commands to electronic speed controllers 344, 346, 348, 350 such that each propulsion assembly 312, 314, 316, 318 may be individually and independently controlled and operated. In this manner, flight control system 340 is operable to individually and independently control the operating speed of each propulsion assembly 312, 314, 316, 318.

Propulsion assembly 312 includes electric motor 320 and rotor assembly 322, propulsion assembly 314 includes electric motor 324 and rotor assembly 326, propulsion assembly 316 includes electric motor 328 and rotor assembly 330 and propulsion assembly 318 includes electric motor 332 and rotor assembly 334. Each rotor assembly 322, 326, 330, 334 is coupled to an output drive of a respective electrical motor 320, 324, 328, 332 that rotates the rotor assembly 322, 326, 330, 334 in a rotational plane to generate thrust for aircraft 310. In the illustrated embodiment, rotor assemblies 322, 326, 330, 334 each include two rotor blades having a fixed pitch. In other embodiments, the rotor assemblies could have other numbers of rotor blades greater than two. Alternatively or additionally, the rotor assemblies could have variable pitch rotor blades.

Flight control system 340 may autonomously control some or all aspects of flight operation for aircraft 310. Flight control system 340 is also operable to communicate with remote systems, such as a ground station via a wireless communications protocol. The remote system may be operable to receive flight data from and provide commands to flight control system 340 to enable remote flight control over some or all aspects of flight operation for aircraft 310. The autonomous and/or remote operation of aircraft 310 enables aircraft 310 to perform unmanned logistic operations for both military and commercial applications.

Referring additionally to FIG. 13 in the drawings, a block diagram depicts aircraft control system 370 operable for use with aircraft 310 of the present disclosure. In the illustrated embodiment, control system 370 includes two primary computer based subsystems; namely, an autonomous system 372 and a remote system 374. As discussed herein, the aircraft of the present disclosure may be operated autonomously responsive to commands generated by flight control system 340. In the illustrated embodiment, flight control system 340 includes command module 376, monitoring module 378 and controllers 380 such as a power controller and electronic speed controllers 344, 346, 348, 350 discussed above. It is to be understood by those skilled in the art that these and other modules executed by flight control system 340 may be implemented in a variety of forms including hardware, software, firmware, special purpose processors and combinations thereof.

During the various flight operating modes of aircraft 310, monitoring module 378 may receive feedback from the propulsion assemblies 312, 314, 316, 318, controllers 380, electric power system 342, navigation system 352, communication system 354 and/or sensor system 356. This feedback is processed by monitoring module 378 to supply correction data and other information to command module 376 and/or controllers 380. Sensor system 356 may include altitude sensors, attitude sensors, speed sensors, environmental sensors, fuel supply sensors, temperature sensors and the like that provide additional information to monitoring module 378 to further enhance autonomous control capabilities.

Some or all of the autonomous control capability of flight control system 340 can be augmented or supplanted by remote flight control system 374. Remote system 374 may include one or more computing systems that may be implemented on general-purpose computers, special purpose computers or other machines with memory and processing capability including, for example, a tablet computer. The computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 374 communicates with flight control system 340 via communication system 354 over a communication link 382 that may include both wired and wireless connections.

Remote system 374 preferably includes one or more display devices 384 configured to display information relating to or obtained by one or more aircraft of the present disclosure. Remote system 374 may also include audio output and input devices such as a microphone, speakers and/or an audio port allowing an operator to communicate with, for example, other remote station operators. Display device 384 may also serve as a remote input device 376 if a touch screen display implementation is used, however, other remote input devices, such as a keyboard or joysticks, may alternatively be used to allow an operator to provide control commands to aircraft 310.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An unmanned aerial system comprising:
a modular airframe comprising:
a plurality of interchangeable upper wing modules each having a respective function and an airfoil cross section;
a lower wing module having an airfoil cross section; and
first and second pylons each having top and bottom ends, the plurality of interchangeable upper wing modules interchangeably mountable to the top ends of the pylons to enable the airframe to support the respective function of a selected one of the plurality of interchangeable upper wing modules, the lower wing module mounted to the bottom ends of the pylons;
a thrust array coupled to the airframe including first and second propulsion assemblies coupled to the selected interchangeable upper wing module and third and fourth propulsion assemblies coupled to the lower wing module;
an electric power system operably associated with the thrust array and operable to provide power to each propulsion assembly; and
a flight control system operably associated with the thrust array and operable to independently control the speed of each propulsion assembly;
wherein, each of the plurality of interchangeable upper wing modules comprises a pylon mounting interface configured to form pivot joints with the top ends of the pylons to enable rotation of the pylons relative to the selected interchangeable upper wing module; and
wherein, in a flight configuration, the selected interchangeable upper wing module is parallel with the lower wing module and the first pylon is parallel with the second pylon such that the airframe has a rectangular cross section.

2. The unmanned aerial system as recited in claim 1 wherein the plurality of interchangeable upper wing modules comprise an autonomous navigation system wing module including a navigation system.

3. The unmanned aerial system as recited in claim 1 wherein the plurality of interchangeable upper wing modules comprise a remote navigation system wing module including a navigation system.

4. The unmanned aerial system as recited in claim 1 wherein the plurality of interchangeable upper wing modules comprise a sensor system wing module including one or more sensors.

5. The unmanned aerial system as recited in claim 1 wherein the plurality of interchangeable upper wing modules comprise a communication system wing module including a wireless communication system.

6. The unmanned aerial system as recited in claim 1 wherein the plurality of interchangeable upper wing modules comprise a cargo storage wing module forming a storage bay.

7. The unmanned aerial system as recited in claim 1 wherein the plurality of interchangeable upper wing modules comprise a flight control system and electric power system wing module including a flight control computer and one or more batteries.

8. The unmanned aerial system as recited in claim 1 wherein the pivot joints comprise pivot locks configured to selectively lock rotation of the pylons relative to the selected interchangeable upper wing module.

9. An unmanned aerial system comprising:
a modular airframe comprising:
an upper wing module having an airfoil cross section;
a plurality of interchangeable lower wing modules each having a respective function and an airfoil cross section; and
first and second pylons each having top and bottom ends, the upper wing module mounted to the top ends of the pylons, the plurality of interchangeable lower wing modules interchangeably mountable to the bottom ends of the pylons to enable the airframe to support the respective function of a selected one of the plurality of interchangeable lower wing modules;
a thrust array coupled to the airframe including first and second propulsion assemblies coupled to the upper wing module and third and fourth propulsion assemblies coupled to the selected interchangeable lower wing module;
an electric power system operably associated with the thrust array and operable to provide power to each propulsion assembly; and
a flight control system operably associated with the thrust array and operable to independently control the speed of each propulsion assembly;
wherein, each of the plurality of interchangeable lower wing modules comprises a pylon mounting interface configured to form pivot joints with the bottom ends of the pylons to enable rotation of the pylons relative to the selected interchangeable lower wing module; and
wherein, in a flight configuration, the upper wing module is parallel with the selected interchangeable lower wing module and the first pylon is parallel with the second pylon such that the airframe has a rectangular cross section.

10. The unmanned aerial system as recited in claim 9 wherein the plurality of interchangeable lower wing modules comprise a remote navigation system wing module including a navigation system.

11. The unmanned aerial system as recited in claim 9 wherein the plurality of interchangeable lower wing modules comprise a sensor system wing module including one or more sensors.

12. The unmanned aerial system as recited in claim 9 wherein the plurality of interchangeable lower wing modules comprise a communication system wing module including a wireless communication system.

13. The unmanned aerial system as recited in claim 9 wherein the plurality of interchangeable lower wing modules comprise a cargo storage wing module forming a storage bay.

14. The unmanned aerial system as recited in claim 9 wherein the plurality of interchangeable lower wing modules comprise a flight control system and electric power system wing module including a flight control computer and one or more batteries.

15. The unmanned aerial system as recited in claim 9 wherein the pivot joints comprise pivot locks configured to selectively lock rotation of the pylons relative to the selected interchangeable lower wing module.

16. An unmanned aerial system comprising:
a modular airframe comprising:
a plurality of interchangeable upper wing modules each having a respective function and an airfoil cross section;
a plurality of interchangeable lower wing modules each having a respective function and an airfoil cross section; and
first and second pylons each having top and bottom ends, the plurality of interchangeable upper wing modules interchangeably mountable to the top ends of the pylons to enable the airframe to support the respective function of a selected one of the plurality of interchangeable upper wing modules, the plurality of interchangeable lower wing modules interchangeably mountable to the bottom ends of the pylons to enable the airframe to support the respective function of a selected one of the plurality of interchangeable lower wing modules;
a thrust array coupled to the airframe including first and second propulsion assemblies coupled to the selected interchangeable upper wing module and third and fourth propulsion assemblies coupled to the selected interchangeable lower wing module;
an electric power system operably associated with the thrust array and operable to provide power to each propulsion assembly; and
a flight control system operably associated with the thrust array and operable to independently control the speed of each propulsion assembly;
wherein, each of the plurality of interchangeable upper wing modules comprises a pylon mounting interface configured to form pivot joints with the top ends of the pylons to enable rotation of the pylons relative to the selected interchangeable upper wing module;
wherein, each of the plurality of interchangeable lower wing modules comprises a pylon mounting interface configured to form pivot joints with the bottom ends of the pylons to enable rotation of the pylons relative to the selected interchangeable lower wing module; and
wherein, in a flight configuration, the selected interchangeable upper wing module is parallel with the selected interchangeable lower wing module and the first pylon is parallel with the second pylon such that the airframe has a rectangular cross section.

17. The unmanned aerial system as recited in claim 16 wherein the selected interchangeable upper wing module comprises a flight control system and electric power system wing module including a flight control computer and one or more batteries and wherein the selected interchangeable lower wing module comprises a sensor system wing module including one or more sensors.

18. The unmanned aerial system as recited in claim 16 wherein the selected interchangeable upper wing module comprises a flight control system and electric power system wing module including a flight control computer and one or more batteries and wherein the selected interchangeable lower wing module comprises a communication system wing module including a wireless communication system.

19. The unmanned aerial system as recited in claim 16 wherein the selected interchangeable upper wing module comprises a cargo storage wing module forming a storage bay and wherein the selected interchangeable lower wing module comprises a flight control system and electric power system wing module including a flight control computer and one or more batteries.

20. The unmanned aerial system as recited in claim 16 wherein the pivot joints comprise pivot locks configured to selectively lock rotation of the pylons relative to the selected interchangeable upper and lower wing modules.

* * * * *